United States Patent [19]

Bruck et al.

[11] Patent Number: 5,271,014
[45] Date of Patent: Dec. 14, 1993

[54] METHOD AND APPARATUS FOR A FAULT-TOLERANT MESH WITH SPARE NODES

[75] Inventors: Jehoshua Bruck, Palo Alto; Robert E. Cypher, Los Gatos; Ching-Tien Ho, San Jose, all of Calif.

[73] Assignee: International Business Machines Corporation, Armonk, N.Y.

[21] Appl. No.: 878,946

[22] Filed: May 4, 1992

[51] Int. Cl.$^5$ .............................................. G06F 15/00
[52] U.S. Cl. .................................. 371/11.1; 371/11.3; 364/230; 395/575
[58] Field of Search ................ 371/8.1, 8.2, 9.1, 11.1, 371/11.3; 395/325, 575; 364/230, 285.3

[56] References Cited

U.S. PATENT DOCUMENTS

| | | | |
|---|---|---|---|
| 4,047,163 | 9/1977 | Choate et al. | 340/173 R |
| 4,051,354 | 9/1977 | Choate | 235/312 |
| 4,302,819 | 11/1981 | Ware et al. | 364/737 |
| 4,605,928 | 8/1986 | Georgiou | 340/825.94 |
| 4,698,807 | 10/1987 | Marwood et al. | 371/11 |
| 4,722,084 | 1/1988 | Morton | 371/9 |
| 4,791,603 | 12/1988 | Henry | 364/900 |
| 4,868,818 | 9/1989 | Madan et al. | 371/11.3 |
| 4,875,207 | 10/1989 | Van Twist et al. | 370/85.12 |
| 4,891,810 | 1/1990 | de Corlieu et al. | 371/9.1 |
| 4,907,232 | 3/1980 | Harper et al. | 371/36 |
| 4,942,517 | 7/1990 | Cok | 395/800 |
| 4,951,220 | 8/1990 | Ramacher et al. | 364/488 |
| 4,970,724 | 11/1990 | Yung | 371/9.1 |
| 5,020,059 | 5/1991 | Gorin et al. | 371/11.3 |
| 5,038,386 | 8/1991 | Li | 382/49 |
| 5,065,308 | 11/1991 | Evans | 395/800 |
| 5,201,044 | 4/1993 | Frey, Jr. et al. | 395/575 |

FOREIGN PATENT DOCUMENTS

| | | |
|---|---|---|
| 398971 | 8/1989 | European Pat. Off. |
| 2583943 | of 0000 | France. |
| 2231985A | 3/1990 | United Kingdom. |

OTHER PUBLICATIONS

Li, "Diagonal Replacement Scheme to Recover Fault in a Mesh", Research Disclosure No. 309, Kenneth Mason Publications, Ltd. England, Jan. 1990.

Kaklamanis et al., "Asymptotically Tight Bounds for Computing with Faulty Array Processors", 31st IEEE Symp., Foundations of Computer Science.

Kung et al., "Fault-Tolerant Array Processors Using Single-Track Switches", IEEE Trans. Computers, vol. C-38, No. 4, pp. 501-514, Apri. 1989.

Hayes, "A Graph Model for Fault-Tolerant Computing Systems", IEEE Trans. Computers, vol. C-25, No. 9, pp. 875-884, Sep. 1976.

Wong, et al., "Minimum k-Hamiltonian Graphs", Journal of Graph Theory vol. 8, pp. 155-165, 1984.

(List continued on next page.)

Primary Examiner—Vincent P. Canney
Attorney, Agent, or Firm—James C. Pintner; Lucas S. Chang

[57] ABSTRACT

A method and apparatus are presented for tolerating up to k faults in a d-dimensional mesh architecture based on the approach of adding spare components (nodes) and extra links (edges) to a given target mesh where m spare nodes (m≧k) are added and the maximum number of links per node (degree of the mesh) is kept small. The resulting architecture can be reconfigured, without the use of switches, as an operable target mesh in the presence of up to k faults, regardless of their distribution. According to one aspect of the invention, given a d-dimensional mesh architecture having $N = n_1 \times n_2 \times \ldots \times n_d$ nodes, the fault-tolerant mesh can be represented by a diagonal or circulant graph having $N+m-k$ nodes, where m≧k. This graph has the property that given any set of k or fewer faulty nodes, the remaining graph, after the performance of a pre-determined node renaming process, is guaranteed to contain as a subgraph the graph corresponding to the target mesh M so long as d≧2 and $n_d$≧3. The invention also relates to a method and apparatus for efficiently locating a healthy target mesh in the presence of up to k faulty network components, given a fault-tolerant mesh constructed in accordance with the teaching set forth herein.

69 Claims, 17 Drawing Sheets

OTHER PUBLICATIONS

Paoli et al., "Minimum k-Hamiltonian Graphs II," Journal of Graph Theory vol. 8, pp. 155–165, 1984.

Dutt et al., "On Designing and Reconfiguring k-Fault-Tolerant Tree Architectures", IEEE Trans. Computers, vol. C-39, No. 4, pp. 490–503, Apr. 1990.

Dutt et al., "An Automorphic Approach to the Design of Fault-Tolerant Microprocessors," Proceedings, 19th International Symposium on Fault-Tolerant Computing, pp. 496–503, Jun. 1989.

Bruck et al., U.S. Patent Application Ser. No. 07/723,287, "Method and Apparatus for Tolerating Faults in Mesh Architectures," Jun. 1991.

Bruck et al., "Efficient Fault-Tolerant Meshes and Hypercubes Architectures", IBM Research Report RJ 8566, Jan. 1991.

Bruck et al., "Fault-Tolerant Parallel Architectures with Minimum Numbers of Spares," IBM Research Report RJ 8029, Mar. 1991.

Bruck et al., "Fault-Tolerant Meshes and Hypercubes with Minimum Numbers of Spares," IBM Research Report RJ 8211, Jul. 1991.

Batcher, "Design of a Massively Parallel Processor", IEEE Trans. Computers vol. 9, pp. 836–840, Sep. 1980.

Elspas et al., "Graphs with Circulant Adjacency Matrices, Journal of combinatorial Theory", vol. 9, pp. 297–307, 1970.

Kuo et al., "Efficient Spare Allocation for Reconfigurable Arrays," IEEE Design and Test, pp. 24–31, Feb. 1987.

Leighton et al., "Wafer Scale Integration of Systolic Arrays," IEEE Trans. Computers, vol. 34, No. 5, (pp. 297–311), May 1985.

Roychowdhury et al., "Efficient Algorithms for Reconfiguration in VLSI/WSI Arrays," IEEE Trans., Computers, vol. C-39, No. 4 pp. 480–489, Apr. 1990.

Rosenberg, "The Diogenes Approach to Testable Fault-Tolerant Arrays of Processors", IEEE Trans. Computers, vol. C-32, No. 10, pp. 802–910, Oct. 1983.

Sami et al., "Reconfigurable Architecture for VLSI Processing Arrays", Proceedings IEEE, vol. 74, No. 5, pp. 712–722, May 1986.

Ueoka et al., "A Defect-Tolerant Design for Full-Wafer Memory LSI", IEEE Journal of Solid-State Circuit, vol. SC-19, No. 3, pp. 319–324, Jun. 1984.

Skerret, "The Terflops", Popular Science, Mar. 1992, pp. 50–55, 88, 89.

Banerjee et al., Algorithm-Based Fault Tolerance on a Hypercube Multi-processor, vol. 39, No. 9, Sep. 1990, IEEE Transactions in Computers, pp. 1132–1145.

$$\begin{pmatrix}
0 & 0 & 0 & 1 & 1 & 1 & 0 & 0 & 0 & 0 & 0 & 0 & 0 & 0 & 0 & 0 \\
0 & 0 & 0 & 0 & 1 & 1 & 1 & 0 & 0 & 0 & 0 & 0 & 0 & 0 & 0 & 0 \\
0 & 0 & 0 & 0 & 0 & 1 & 1 & 1 & 0 & 0 & 0 & 0 & 0 & 0 & 0 & 0 \\
1 & 0 & 0 & 0 & 0 & 0 & 1 & 1 & 1 & 0 & 0 & 0 & 0 & 0 & 0 & 0 \\
1 & 1 & 0 & 0 & 0 & 0 & 0 & 1 & 1 & 1 & 0 & 0 & 0 & 0 & 0 & 0 \\
1 & 1 & 1 & 0 & 0 & 0 & 0 & 0 & 1 & 1 & 1 & 0 & 0 & 0 & 0 & 0 \\
0 & 1 & 1 & 1 & 0 & 0 & 0 & 0 & 0 & 1 & 1 & 1 & 0 & 0 & 0 & 0 \\
0 & 0 & 1 & 1 & 1 & 0 & 0 & 0 & 0 & 0 & 1 & 1 & 1 & 0 & 0 & 0 \\
0 & 0 & 0 & 1 & 1 & 1 & 0 & 0 & 0 & 0 & 0 & 1 & 1 & 1 & 0 & 0 \\
0 & 0 & 0 & 0 & 1 & 1 & 1 & 0 & 0 & 0 & 0 & 0 & 1 & 1 & 1 & 0 \\
0 & 0 & 0 & 0 & 0 & 1 & 1 & 1 & 0 & 0 & 0 & 0 & 0 & 1 & 1 & 1 \\
0 & 0 & 0 & 0 & 0 & 0 & 1 & 1 & 1 & 0 & 0 & 0 & 0 & 0 & 1 & 1 \\
0 & 0 & 0 & 0 & 0 & 0 & 0 & 1 & 1 & 1 & 0 & 0 & 0 & 0 & 0 & 1 \\
0 & 0 & 0 & 0 & 0 & 0 & 0 & 0 & 1 & 1 & 1 & 0 & 0 & 0 & 0 & 0 \\
0 & 0 & 0 & 0 & 0 & 0 & 0 & 0 & 0 & 1 & 1 & 1 & 0 & 0 & 0 & 0 \\
0 & 0 & 0 & 0 & 0 & 0 & 0 & 0 & 0 & 0 & 1 & 1 & 1 & 0 & 0 & 0
\end{pmatrix}$$

*FIG. 2C*

$$\begin{pmatrix}
0 & 0 & 0 & 1 & 1 & 1 & 0 & 0 & 0 & 0 & 0 & 0 & 1 & 1 & 1 & 0 & 0 \\
0 & 0 & 0 & 0 & 1 & 1 & 1 & 0 & 0 & 0 & 0 & 0 & 0 & 1 & 1 & 1 & 0 \\
0 & 0 & 0 & 0 & 0 & 1 & 1 & 1 & 0 & 0 & 0 & 0 & 0 & 0 & 1 & 1 & 1 \\
1 & 0 & 0 & 0 & 0 & 0 & 1 & 1 & 1 & 0 & 0 & 0 & 0 & 0 & 0 & 1 & 1 \\
1 & 1 & 0 & 0 & 0 & 0 & 0 & 1 & 1 & 1 & 0 & 0 & 0 & 0 & 0 & 0 & 1 \\
1 & 1 & 1 & 0 & 0 & 0 & 0 & 0 & 1 & 1 & 1 & 0 & 0 & 0 & 0 & 0 & 0 \\
0 & 1 & 1 & 1 & 0 & 0 & 0 & 0 & 0 & 1 & 1 & 1 & 0 & 0 & 0 & 0 & 0 \\
0 & 0 & 1 & 1 & 1 & 0 & 0 & 0 & 0 & 0 & 1 & 1 & 1 & 0 & 0 & 0 & 0 \\
0 & 0 & 0 & 1 & 1 & 1 & 0 & 0 & 0 & 0 & 0 & 1 & 1 & 1 & 0 & 0 & 0 \\
0 & 0 & 0 & 0 & 1 & 1 & 1 & 0 & 0 & 0 & 0 & 0 & 1 & 1 & 1 & 0 & 0 \\
0 & 0 & 0 & 0 & 0 & 1 & 1 & 1 & 0 & 0 & 0 & 0 & 0 & 1 & 1 & 1 & 0 \\
0 & 0 & 0 & 0 & 0 & 0 & 1 & 1 & 1 & 0 & 0 & 0 & 0 & 0 & 1 & 1 & 1 \\
1 & 0 & 0 & 0 & 0 & 0 & 0 & 1 & 1 & 1 & 0 & 0 & 0 & 0 & 0 & 1 & 1 \\
1 & 1 & 0 & 0 & 0 & 0 & 0 & 0 & 1 & 1 & 1 & 0 & 0 & 0 & 0 & 0 & 1 \\
1 & 1 & 1 & 0 & 0 & 0 & 0 & 0 & 0 & 1 & 1 & 1 & 0 & 0 & 0 & 0 & 0 \\
0 & 1 & 1 & 1 & 0 & 0 & 0 & 0 & 0 & 0 & 1 & 1 & 1 & 0 & 0 & 0 & 0 \\
0 & 0 & 1 & 1 & 1 & 0 & 0 & 0 & 0 & 0 & 0 & 1 & 1 & 1 & 0 & 0 & 0
\end{pmatrix}$$

*FIG. 3C*

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |

ROW-MAJOR ORDER

*FIG. 4A*

| 0 | 9 | 18 | 27 | 36 | 5 | 14 | 23 |
|---|---|----|----|----|---|----|----|
| 8 | 17 | 26 | 35 | 4 | 13 | 22 | 31 |
| 16 | 25 | 34 | 3 | 12 | 21 | 30 | 39 |
| 24 | 33 | 2 | 11 | 20 | 29 | 38 | 7 |
| 32 | 1 | 10 | 19 | 28 | 37 | 6 | 15 |

ANTIDIAGONAL-MAJOR ORDER

*FIG. 4B*

| 0 | 21 | 3 | 25 | 8 | 30 | 13 | 35 |
|---|----|---|----|---|----|----|----|
| 20 | 2 | 24 | 7 | 29 | 12 | 34 | 17 |
| 1 | 23 | 6 | 28 | 11 | 33 | 16 | 38 |
| 22 | 5 | 27 | 10 | 32 | 15 | 37 | 19 |
| 4 | 26 | 9 | 31 | 14 | 36 | 18 | 39 |

INTERLEAVED ANTIDIAGONAL-MAJOR ORDER

*FIG. 4C*

| 0 | 13 | 26 | 11 |
|---|---|---|---|
| 12 | 25 | 10 | 23 |
| 24 | 9 | 22 | 7 |
| 8 | 21 | 6 | 19 |
| 20 | 5 | 18 | 3 |
| 4 | 17 | 2 | 15 |
| 16 | 1 | 14 | 27 | r is odd
S={12,13,15,16}

*FIG. 5A*

| 0 | 13 | 26 | 7 |
|---|---|---|---|
| 12 | 25 | 6 | 19 |
| 24 | 5 | 18 | 31 |
| 4 | 17 | 30 | 11 |
| 16 | 29 | 10 | 23 |
| 28 | 9 | 22 | 3 |
| 8 | 21 | 2 | 15 |
| 20 | 1 | 14 | 27 | r mod 4 = 0
S={12,13,19,20}

*FIG. 5B*

| 0 | 13 | 26 | 39 |
|---|----|----|----|
| 12 | 25 | 38 | 11 |
| 24 | 37 | 10 | 23 |
| 36 | 9 | 22 | 35 |
| 8 | 21 | 34 | 7 |
| 20 | 33 | 6 | 19 |
| 32 | 5 | 18 | 31 |
| 4 | 17 | 30 | 3 |
| 16 | 29 | 2 | 15 |
| 28 | 1 | 14 | 27 | r mod 4 = 2
S={12,13,27,28}

*FIG. 5C*

| 5 | 0 | 7 | 2 | 9 | 4 |
|---|---|---|---|---|---|
| 11 | 6 | 13 | 8 | 15 | 10 |
| 17 | 12 | 19 | 14 | 21 | 16 |
| 23 | 18 | 25 | 20 | 27 | 22 |
| 29 | 24 | 31 | 26 | 33 | 28 |
| 35 | 30 | 37 | 32 | 39 | 34 |
| 41 | 36 | 43 | 38 | 45 | 40 |

*FIG. 10A*

|  |  | 1 |  | 3 |  |
|---|---|---|---|---|---|
| 5 | 0 | 7 | 2 | 9 | 4 |
| 11 | 6 | 13 | 8 | 15 | 10 |
| 17 | 12 | 19 | 14 | 21 | 16 |
| 23 | 18 | 25 | 20 | 27 | 22 |
| 29 | 24 | 31 | 26 | 33 | 28 |
| 35 | 30 | 37 | 32 | 39 | 34 |
| 41 | 36 | 43 | 38 | 45 | 40 |
|  |  | 42 |  | 44 |  |

*FIG. 10B*

|  |  | 1 |  | 3 |  |
|---|---|---|---|---|---|
| 5 | 0 | 7 | 2 | 9 | 4 |
| 11 | 6 | 13 | 8 | 15 | 10 |
| 17 | 12 | 19 | 14 | 21 | 16 |
| 23 | 18 | 25 | 20 | 27 | 22 |
| 29 | 24 | 31 | 26 | 33 | 28 |
| 35 | 30 | 37 | 32 | 39 | 34 |
| 41 | 36 | 43 | 38 | 45 | 40 |
|  |  | 42 |  | 44 |  | 46 |

*FIG. 10C*

|   |   | 1 |   | 3 |   |
|---|---|---|---|---|---|
| 5 | 0 | 7 | 2 | 9 | 4 |
| 11 | 6 | 13 | 8 | 15 | 10 |
| 17 | 12 | 19 | ✕ | 21 | ✕ |
| 23 | ■ | 25 | ✕ | 27 | ✕ |
| 29 | 24 | 31 | 26 | 33 | 28 |
| 35 | 30 | 37 | 32 | 39 | 34 |
| 41 | 36 | 43 | 38 | 45 | 40 |
|   |   | 42 |   | 44 |   | 46 |

*FIG. 10D*

|   |   | 29 |   | 31 |   |
|---|---|---|---|---|---|
| 33 | 28 | 35 | 30 | 37 | 32 |
| 39 | 34 | 41 | 36 | 43 | 38 |
| 45 | 40 | 0 | ✕ | 2 | ✕ |
| 4 | ■ | 6 | ✕ | 8 | ✕ |
| 10 | 5 | 12 | 7 | 14 | 9 |
| 16 | 11 | 18 | 13 | 20 | 15 |
| 22 | 17 | 24 | 19 | 26 | 21 |
|   |   | 23 |   | 25 |   | 27 |

*FIG. 10E*

| 0 | 9 | 18 | 27 | 36 | 5 | 14 | 23 | 41 |
|---|---|---|---|---|---|---|---|---|
| 8 | 17 | 26 | 35 | 4 | 13 | 22 | 31 | 40 |
| 16 | 25 | 34 | 3 | 12 | 21 | 30 | 39 | |
| 24 | 33 | 2 | 11 | 20 | 29 | 38 | 7 | |
| 32 | 1 | 10 | 19 | 28 | 37 | 6 | 15 | |

*FIG. 11A*

| 0 | 9 | 18 | 27 | 36 | 5 | 14 | 23 | 41 |
|---|---|---|---|---|---|---|---|---|
| 8 | 17 | 26 | 35 | 4 | 13 | 22 | 31 | 40 |
| 16 | 25 | 34 | 3 | 12 | ■ | 30 | 39 | |
| 24 | 33 | 2 | ■ | 20 | 29 | 38 | 7 | |
| 32 | 1 | 10 | 19 | 28 | 37 | 6 | 15 | |

*FIG. 11B*

| 0 | 9 | 17 | 25 | 34 | 5 | 13 | 21 | 39 |
|---|---|---|---|---|---|---|---|---|
| 8 | 16 | 24 | 33 | 4 | 12 | 20 | 29 | 38 |
| 15 | 23 | 32 | 3 | 11 | ■ | 28 | 37 | |
| 22 | 31 | 2 | ■ | 19 | 27 | 36 | 7 | |
| 30 | 1 | 10 | 18 | 26 | 35 | 6 | 14 | |

*FIG. 11C*

METHOD AND APPARATUS FOR A FAULT-TOLERANT MESH WITH SPARE NODES

FIELD OF THE INVENTION

This invention generally relates to parallel or network architectures for massively parallel computers or other element arrays. More particularly, the invention relates to (1) mesh architectures which can sustain up to a pre-selected number of faults and operate without experiencing a degradation in the performance of the system supported by the architecture; and (2) techniques for efficiently locating a healthy mesh in the presence of faulty network components.

DESCRIPTION OF THE PRIOR ART

It is well known to use network architectures in which a plurality of computers, microprocessors, or other element arrays (for example, parallel memory arrays) are linked together to achieve high-speed, massively parallel performance. Mesh architecture is one of the most important parallel architectures used in designing parallel computers and element arrays and for connecting computing modules on a board or chip, etc.

A mesh-like architecture may be broadly defined as an architecture including a plurality of nodes and an interconnect structure defined in a specific way. In topological terms, the nodes are laid out in a regular pattern, such as a d-dimensional array. Each node is connected to several other nodes in the mesh according to a pre-determined connection pattern which holds throughout the mesh. All the inter-node connections together make up the interconnect structure. For example, in a formal sense, a d-dimensional mesh M is defined as having $N = n_1 \times n_2 \times \ldots \times n_d$ nodes, where each $n_i$ specifies the number of nodes (the "length") of the i-th dimension. In a four-connected mesh, each node is connected to at most 2d nodes to form the interconnect structure. As a further example, FIG. 1A shows a 16-node mesh architecture in which the nodes are topologically arranged in a 4×4 array. Each node is connected to its upper, lower, left, and right neighbors. Of course, the nodes need not be physically laid out in the array shown. Rather, it is understood that the interconnections between the nodes are topologically equivalent to the array shown.

A number of parallel computers with two-dimensional mesh topologies has been created or are under development. Examples include the MPP computer by Goodyear Aerospace, the MP-1 sold by MASPAR, the VICTOR by IBM, the DELTA being developed by Intel and Caltech, the PARAGON XP/S by Intel, etc.

One of the most important and challenging issues in massively parallel networks is to design systems capable of maintaining high performance in the presence of faults. For example, in a parallel computer, one would like the machine to have the same, or nearly the same, functionality and performance in the presence of a pre-determined number of faults.

Wafer Scale Integration (WSI) arrays provide another example where mesh architecture may be employed and where fault-tolerant design is important. It would obviously be advantageous not to have to discard a whole wafer just because a small number of the components in an array on the wafer is faulty. While WSI is a technology that can increase performance, it has not yet had a significant impact in the market largely because of yield problems. Hence, it is of major practical importance to develop efficient techniques (in terms of redundancy cost) to handle faults in mesh architectures like those used for WSI, etc.

Many prior art patents and publications are directed to teaching how to create and use fault-tolerant networks for a variety of applications. Not all of the teachings involve the use of mesh architectures. Many teachings work only for specific types of faulty components, e.g., memory components or processors, but not both. Still other teachings require large numbers of spare components and/or switches, extra communication links, etc., which tend to increase network cost and degrade performance. Some teachings do not work at all if the network structure is such that it is impossible to mask the failure of a particular component included in the architectures.

For example, U.S. Pat. No. 4,047,163, to Choate et al., U.S. Pat. No. 4,051,354, to Choate, and U.S. Pat. No. 4,791,603, to Henry, describe fault-tolerant techniques that work only for memory devices and do not extend to or include fault-tolerant interconnection networks.

U.S. Pat. No. 4,605,928, to Georgiou, applies fault-tolerance to cross-point (crossbar) matrices by partitioning the matrices into sub-matrices and adding redundant sub-matrices. However, buses are used to connect and control sub-matrices, and the method cannot be directly applied to fault-tolerant meshes.

U.S. Pat. No. 4,868,818, to Madan et al., describes a fault-tolerant method for hypercubes. The hypercube is first partitioned into a number of subcubes connected through a local area network. A spare node is added to each subcube by connecting the spare node to all nodes in the subcube. Thus, even with a very high degree (i.e., the number of links per node), the hypercube can tolerate only one fault with the worst-case distribution.

U.S. Pat. No. 4,302,819, to Ware, describes a fault-tolerant scheme which requires an entire row to be discarded when each new fault is discovered. Thus, the cost in terms of spare nodes is very high.

U.S. Pat. No. 4,891,810, to de Corlieu et al., describes a reconfiguration scheme wherein nodes are connected with a bus, rendering it impossible to transmit simultaneously data of different mesh connections. As a result, the performance of the computing system is greatly reduced by the presence of faults.

Many of the prior art approaches to enhancing the fault-tolerant characteristics of a network involve the addition of switches. In general, these systems have the potential to cause significant processing delays. Example of such systems are taught, for example, in European Patent EP-398,971, to Osmon et al., describing fault-tolerant networks with added switches. Messages are routed through a potentially large number of switches and an undesirable "slowdown" factor is inevitably introduced.

U.S. Pat. No. 4,970,724, to Yung, describes a method for fault tolerance which requires a total of $r \times c/2$ spare nodes for a mesh with $r \times c$ nodes. It can tolerate only two faults with the worst-case distribution. It also requires routing through the faulty nodes. This method is thus much more expensive in terms of spare nodes and less powerful in terms of the fault model.

The concept of adding spare nodes to create fault-tolerant architectures is known, as indicated hereinabove. However, none of the known techniques take care to (1) minimize network cost by keeping the number of spare nodes at or close to a minimum; (2) provide fault-tolerance even in the event of total node failure where communication through the faulty node is impossible; and (3) at the same time require a small increase in the number of links per node (i.e., the degree) of the fault-tolerant network being created, compared to the degree of the underlying network which must remain operative under specified fault conditions.

A recent article entitled "Diagonal Replacement Scheme to Recover Fault in a Mesh," published anonymously in Research Disclosure, No. 309, by Kenneth Mason Publications, Ltd., England, January 1990, exemplifies the state of the art. Here, a fault-recovery scheme for a parallel processor is disclosed; however, the scheme only works for square two-dimensional meshes and can tolerate at most two faults with the worst case distribution. Furthermore, the scheme is unrelated to any application involving diagonal or circulant graphs.

To summarize the present state of the art in view of the aforementioned references, there are two basic prior-art methods for tolerating faults in mesh architectures.

The first method is to functionally mask the effect of faults by simulating the mesh with the healthy part of the architecture. In other words, those non-faulty nodes will take up the workload of the faulty nodes, in an effort to obtain the same functionality with a reasonable slowdown factor. While this approach may be theoretically sound, for example see Kaklamanis et al., "Asymptotically Tight Bounds for Computing with Faulty Array Processors," 31st IEEE Symp. Foundations of Computer Science, pp. 285-296, October 1990, the slowdown in performance makes it unattractive in practice. Furthermore, the teachings of Kaklamanis et al., like several other references cited hereinabove, work only when a component can simulate several other components, such as in a parallel machine. If the nodes comprise components not capable of simulating multiple components, such as memory chips, the method taught by the references will fail to provide the desired fault-tolerance.

The second known approach for tolerating faults in a mesh architecture, typified by several of the aforesaid references, is to add spare processors and extra links or switches to the architecture. The idea of this approach is to isolate the faults, either by ignoring some connections or by setting the switches, while maintaining a complete mesh structure with the healthy nodes. A further example of this approach is described in a paper by Kung et al., "Fault-Tolerant Array Processors Using Single-Track Switches," IEEE Trans. Computers, Vol. C-38, No. 4, pp. 501-514, April 1989, where a switching mechanism is invoked in the presence of faults.

This second known approach for obtaining fault-tolerance in a mesh architecture are often problematic. For example, if a switch mechanism is used, the mechanism itself must be fault-free. Furthermore, since the addition of switches and resulting extra links increases network cost, it must be done in a manner as efficient as possible. Further yet, these extra switches and links tend to decrease the speed of the architecture, thereby degrading network performance.

Alternatively, there exists prior art which utilizes graph models to develop a variety of different fault-tolerant architectures not including meshes. For example, Hayes, "A Graph Model for Fault-Tolerant Computing Systems," IEEE Transactions on Computers, Vol. C-25, No. 9, pp. 875-884, September 1976, teaches the use of a fault-tolerant graph with target graphs of cycles, linear arrays, and trees. Only cycles are taught in Wong et al., "Minimum k-Hamiltonian Graphs," Journal of Graph Theory, Vol. 8, pp. 155-165, 1984; and Paoli et al., "Minimum k-Hamiltonian Graphs II," Journal of Graph Theory, Vol. 10, pp. 79-95, 1986. Dutt et al., "On Designing and Reconfiguring k Fault-Tolerant Tree Architectures," IEEE Trans. Computers, Vol. C-29, No. 9, pp. 836-840, 1980; and "An Automorphic Approach to the Design of Fault-Tolerant Microprocessors," Proceedings, 19th International Symposium on Fault Tolerant Computers, pp. 496-503, June 1989, relate respectively to target graphs consisting of trees and hypercubes. However, none of the above graph models are known to be applied to mesh architectures.

In U.S. patent application Ser. No. 07/723,287, Bruck et al. describe a method and apparatus for tolerating faults in a d-dimensional meshes architecture. The fault-tolerant mesh architecture disclosed therein has a number of spare nodes that is always equal to the number of faults. In addition, the method for finding healthy mesh given a set of k faults represent a row-major ordering of the mesh. In Bruck et al., "Efficient Fault-tolerant Meshes and Hypercubes Architectures", IBM Research Report RJ 8566 (Jan. 16, 1992), there is a definition of a diagonal graph and a general description of a technique for adding fault tolerance to diagonal graphs, including an application to meshes. As will be clarified in the instant patent application, the instant invention provides mesh constructions that are particularly well-suited for large meshes, wherein the spare nodes represent a very small fraction of the total number of components. The present invention also has a degree smaller than or comparable to those presented in U.S. patent application Ser. No. 07/723,287, thus providing effective fault-tolerance in the presence of a higher number of faults.

Accordingly it would be desirable to provide a method and apparatus that achieve fault-tolerance in a mesh architecture and avoid the addition of switches and resulting extra links used by many prior art fault-tolerant mechanisms.

Furthermore, it would be desirable to be able to achieve fault-tolerance in a mesh architecture without significantly degrading the performance of the network or increasing its costs.

Still further, it would be desirable to sustain faults in a mesh architecture in which individual components are not able to double for or simulate other components without suffering from significant degradation of system performance.

SUMMARY OF THE INVENTION

Accordingly, it is an object of the invention to provide an efficient method and apparatus for defining, constructing and using fault-tolerant mesh architectures.

It is a further object of the invention to provide fault-tolerant mesh architectures that can sustain a pre-determined number of faults and still each be guaranteed to contain a healthy mesh-connected architecture that can be operated without experiencing slowdown.

Furthermore, it is an object of the invention to provide fault-tolerant mesh architectures that can easily be reconfigured in the presence of faults, without the use of switches, i.e., to provide techniques which can efficiently locate the healthy mesh in a fault-tolerant network in the presence of faulty network components.

Further yet, it is an object of the invention to minimize the cost of fault-tolerant mesh architectures by adding m spare nodes to tolerate up to k faults, where $m \geq k$, while at the same time keeping the number of links per node (i.e., degree of the mesh) small. In particular, it is an object of the invention to provide a method and apparatus for tolerating several faulty nodes by adding a small number of spare components and keeping the degree of the mesh small.

Still further, it is an object of the invention to provide a method and apparatus for constructing and using fault-tolerant mesh architectures that can be generalized for use in parallel computers, other parallel architectures, array of chips on boards, WSI arrays, memory chips, etc.

According to the invention, mesh architectures are viewed as graphs where the nodes in a given graph represent a plurality of components (e.g., processors or memory chips) and the edges of the graph represent communication links between the nodes.

In accordance with this aspect of the invention, a "target mesh" M is first selected, where M can be any d-dimensional mesh with $N = n_1 \times n_2 \times \ldots \times n_d$ nodes, where $n_d \geq 3$ and $n_1 \leq n_2 \leq \ldots \leq n_d$. A k-fault-tolerant (k-FT) mesh $M_k$ with $N+m$ nodes, where m is the number of extra nodes and $m \geq k$, is then defined and constructed by using a diagonal or circulant graph model where the graph also has $N+m$ nodes. The graph representation of $\hat{M}_k$ has the property that, given any set of k faulty nodes, the remaining graph, which consists of $N+m-k$ non-faulty nodes, can be reconfigured to form a new graph containing the target mesh M as a subgraph, after the non-faulty nodes are renamed according to a pre-determined node-renaming process.

It should be noted that m spare nodes are added to obtain a fault-tolerant mesh capable of sustaining up to k faults. This approach to constructing a fault-tolerant mesh guarantees that any process, system, etc., designed to be supported by the target mesh will operate without slowdown in the presence of k or fewer node faults, regardless of their distribution.

Fault-tolerant meshes constructed in accordance with the teachings of the invention may be fabricated at a low cost since their fabrication amounts to constructing a fault-tolerant graph with a low degree (number of links per node) and a low number of spare components.

It should also be noted that fault-tolerant meshes constructed in accordance with the teachings of the invention may be fabricated at a very low cost when the number of faults, k, is greater than 3, since their fabrication amounts to constructing a fault-tolerant graph with a degree smaller than those in any previously known fault-tolerant techniques when k is greater than 3. It should also be noted that the teachings of the invention extend to the tolerance of edge faults as well as node faults, since a node incident with a given faulty edge may be treated as a faulty node.

According to another aspect of the invention, a fault-tolerant network (mesh) $\hat{M}_k$ can be constructed for any given d-dimensional mesh with $N = n_1 \times n_2 \times \ldots \times n_d$ nodes, where $n_d \geq 3$ and $n_1 \leq n_2 \leq \ldots \leq n_d$, where $M_k$ has $N+m$ nodes and can tolerate up to k faults and $m \geq k$. $\hat{M}_k$ constructed in accordance with the teachings of the invention has the property that any $N+m-k$ of the nodes in $\hat{M}_k$ can be reconfigured, without the use of switches, to form the given d-dimensional mesh upon the occurrence of up to k faults.

More particularly, this aspect of the invention relates to a fault-tolerant mesh $\hat{M}_k$ that includes a d-dimensional mesh M having $N+m$ kindred or functionally equivalent nodes, where $\hat{M}_k$ can sustain up to k faults ($m \geq k$) and can be reconfigured without the use of switches to form mesh M, comprising (a) $N+m$ nodes, where the additional m nodes are of the same type as those in mesh M, arranged as a circulant graph; and (b) a plurality of edges for said graph where the edges are defined in any of a number of ways including those defined in the Detailed Description of the present invention.

A further aspect of the invention is directed to a method for locating the healthy mesh in a fault-tolerant mesh $\hat{M}_k$, in the presence of k faults, and according to the invention, a "renaming" process is used which "relabels" the nodes in $\hat{M}_k$ to obtain M, given (1) the values of d, $n_1, n_2, \ldots, n_d$ and k; (2) the structure of the fault-tolerant mesh $\hat{M}_k$ in terms of a circulant graph model; and (3) the locations of the k faults in $\hat{M}_k$.

More particularly, the method for finding healthy mesh M in $\hat{M}_k$, given a set of k faults, where $\hat{M}_k$ has $N+m$ nodes, with $m \geq k$, comprises the steps of (a) determining which non-faulty nodes in $\hat{M}_k$ are to be considered as candidates for node 0 in the non-faulty mesh M; (b) determining which of the candidate non-faulty nodes is to be the first node (node 0) in the target mesh; and (c) assigning an identifier to each non-faulty node, starting with node 0, for the $N+m-k$ nodes, where the set of identifiers represents one of several schemes including row-major ordering, antidiagonal-major ordering, interleaved antidiagonal-major ordering, "seesaw" ordering, and combinations thereof.

The invention features that a fault-tolerant mesh constructed in accordance with the teachings set forth herein will be guaranteed to contain a complete mesh, operable without experiencing slow-down in the presence of up to a pre-determined number of faults. The fault-tolerant mesh can be constructed at low costs in terms of both the degree and the number of spare components, and has a wide range of applications to parallel computers, WSI arrays, memory chip arrays, etc.

These and other objects and features of the present invention and the manner of obtaining them will no doubt become apparent to those skilled in the art, and the invention itself will be best understood by reference to the following detailed description read in conjunction with the various accompanying drawings.

BRIEF DESCRIPTION OF THE DRAWINGS

FIG. 2C depicts the adjacency matrix for the diagonal graph shown in FIG. 2B.

FIG. 3C depicts the adjacency matrix for the circulant graph shown in FIG. 3B.

FIG. 4A depicts a 5×8 mesh constructed in a row-major order.

FIG. 4B depicts a 5×8 mesh constructed in an antidiagonal-major order.

FIG. 4C depicts a 5×8 mesh constructed in an interleaved antidiagonal-major order.

FIG. 5A depicts a 7×4 mesh constructed in accordance with a novel labeling technique.

FIG. 5B depicts a 8×4 mesh constructed in accordance with another novel labeling technique.

FIG. 5C depicts a 10×4 mesh constructed in accordance with still another novel labeling technique.

FIG. 10A-10E depict meshes shown in FIGS. 6B, 7, 8, 9A and 9B, respectively, with edges omitted for clarity.

FIG. 11A depicts a 2-FT (two-fault-tolerant) mesh based upon the 5×8 mesh shown in FIG. 4B.

FIG. 11B depicts the mesh in FIG. 11A with two faulty nodes.

FIG. 11C depicts the reconstructed, relabeled healthy mesh excluding the two faulty nodes in FIG. 11B.

DETAILED DESCRIPTION

Figure 1A:
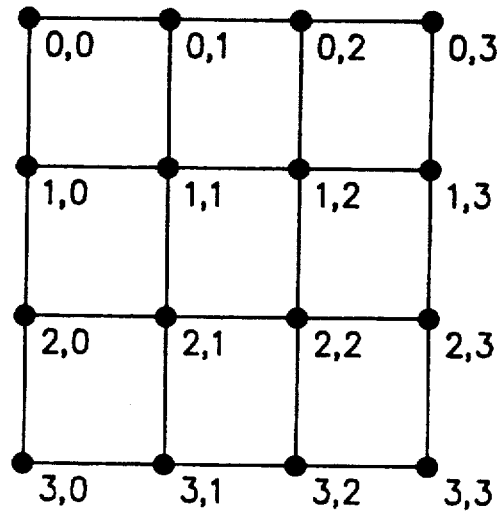
FIG. 1A depicts an example of a two-dimensional mesh having four rows, four columns and 16 nodes labeled conventionally.

According to the invention, if a given mesh architecture is represented as a graph where every node in the graph corresponds to a processor/component and every edge corresponds to a link between processors/components, faulty nodes can be handled by adding a small number of spare nodes and extra edges. Thus, if k node faults are to be tolerated, m spare nodes (m≧k) need to be added to the target mesh having N nodes to obtain a fault-tolerant mesh. When practicing the invention, as will be demonstrated hereinafter, given any set of k node or edge faults, N of the original N+m nodes can be reconfigured as a healthy mesh.

The present invention is readily applicable to d-dimensional meshes, as described hereinafter. However, to facilitate understanding of the invention, it is first described in details in terms of a two-dimensional mesh M with N=r×c nodes, where r is the number of rows and c is the number of columns. Each node is labeled with a unique label of the form (i,j), where $0 \leq i < r$ and $0 \leq j < c$. For the purpose of illustrating several aspects of the invention, each node (i,j) is connected to at most 4 nodes of the form $(i \pm 1, j)$ or $(i, j \pm 1)$. Given a two-dimensional mesh with N nodes, a graph $\hat{M}_k$ with N+m nodes corresponds to a k-FT (k-fault-tolerant) two-dimensional mesh if every subgraph of $\hat{M}_k$ that consists of N+m−k nodes contains M as a subgraph. Thus, the graph $\hat{M}_k$ can tolerate any k faults and still be guaranteed to contain a healthy copy of M.

The invention has two separate parts. The first part is a process for constructing a k-FT two-dimensional mesh $\hat{M}_k$ for any M. The second part is an efficient process for finding the good mesh which is present in $\hat{M}_k$ after it has suffered k faults. This process is referred to hereinafter as the "renaming" process.

It will be understood by those skilled in the art that the aforementioned separate "parts" of the invention may be practiced sequentially or separately. For example, one may be given a fault-tolerant mesh constructed in accordance with the teachings herein and practice only the renaming process; one may simply construct fault-tolerant meshes utilizing the teachings set forth herein without actually monitoring faults, practicing the novel methods described herein for locating a healthy mesh, etc. In any event, the invention is meant to encompass the method and apparatus which facilitate the practice of either or both of the fault-tolerant mesh construction techniques and healthy-mesh-locating techniques to be set forth hereinafter.

As an overview, the construction portion of the invention contemplates viewing the target mesh M as a graph and constructing (defining) therefrom a fault-tolerant graph, representing fault-tolerant mesh $\hat{M}_k$. The renaming process contemplates the assignment of new logical labels to the healthy nodes of a fault-tolerant mesh in the presence of faults.

Before proceeding with the detailed description of the invention, the general concepts of circulant graphs and diagonal graphs are first illustrated. The construction of the fault-tolerant graph $\hat{M}_k$ is based on both circulant and diagonal graphs. A circulant graph is defined by specifying the number of nodes N and a set of jumps or offsets. Given a set of y offsets, $\{S_j | 1 \leq j \leq y\}$, each node i, where $0 \leq i < N$, is connected to nodes $$i+s_1, i-s_1, i+s_2, i-s_2, \ldots, i+s_y, i-s_y \pmod{N},$$

where mod is an abbreviation for modulo.

A diagonal graph is also defined by specifying the number of nodes N it contains and a set of jumps or offsets. Given a set of y offsets, $\{s_j | 1 \leq j \leq y\}$, each node i, where $0 \leq i < N$, is connected to the nodes $$i+s_1, i-s_1, i+s_2, i-s_2, \ldots, i+s_y, i-s_y,$$

provided that any of the nodes is in the range of 0 through N−1. In other words, a diagonal graph is like a circulant graph except that there are no "wraparound edges" connecting higher-numbered nodes to lower-numbered nodes.

Figure 1B:
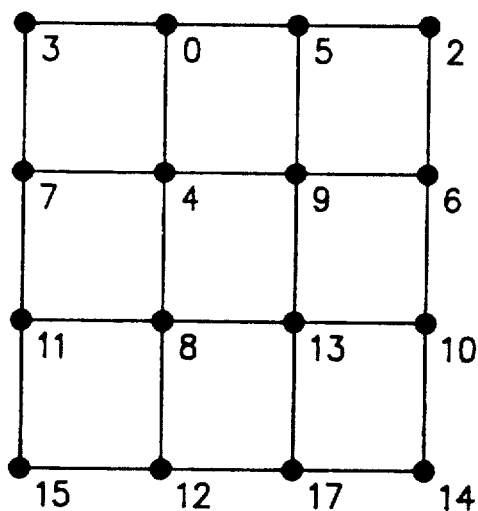
FIG. 1B depicts the two-dimensional mesh shown in FIG. 1A labeled in accordance with a diagonal graph model.
Figure 2A:
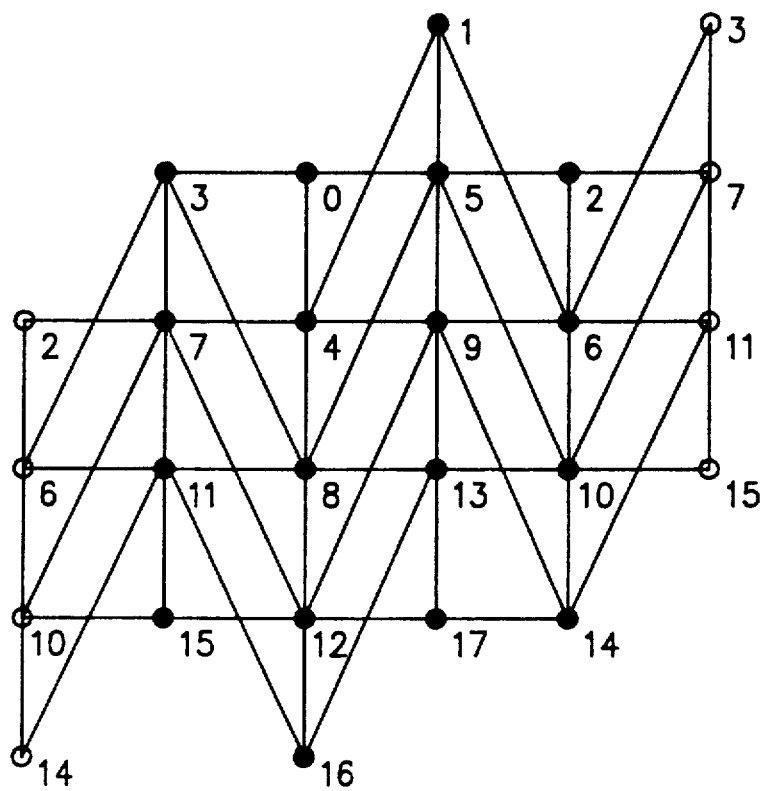
FIG. 2A depicts the two-dimensional mesh shown in FIG. 1B modified with two spare nodes as well as extra edges and labeled in accordance with a diagonal graph model.
Figure 2B:
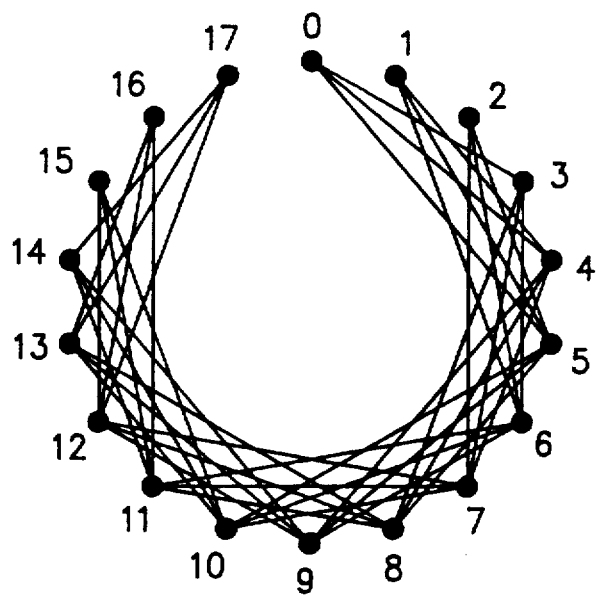
FIG. 2B depicts the diagonal graph corresponding to the two-dimensional mesh shown in FIG. 2A.

FIGS. 1A and 1B exemplify how a simple 4×4 mesh architecture as conventionally labeled can be re-labeled in accordance with a novel labeling scheme of the invention, such that the newly labeled mesh relates to a subgraph of a diagonal graph. FIGS. 2A and 2B illustrate how two spare nodes and extra edges can be added to the mesh shown in FIGS. 1A and 1B.

FIG. 1A depicts an example of a two-dimensional mesh having four rows and four columns and a total of 16 nodes, which are labeled conventionally. Typically, the rows are labeled from 0 to 3 in the top-down order. The columns are labeled from 0 to 3 in the left-to-right order. Thus, each node is identified by two indices, i.e., the row index followed by the column index.

FIG. 1B depicts the same two-dimensional mesh shown in FIG. 1A wherein the 16 nodes are labeled 0 through 17 excluding 1 and 16. This labeling is done in accordance with a novel labeling scheme disclosed hereinafter to relate the mesh architecture to a subgraph of a diagonal graph, such that the offsets of the diagonal graph form a group of consecutive integers.

FIG. 2A depicts the addition of two spare nodes (1 and 16) to the mesh depicted in FIG. 1B. For clarity, some image of nodes, represented by empty circles, are added for the wraparound connections. For instance, to illustrate the wraparound connection between node 3 and node 6, an empty circle also labeled node 6 is shown to the left of the original mesh and connected thereto by a link from node 3. For the sake of definition, the mesh shown in FIG. 2A corresponds to a zero-fault-tolerant graph, $\hat{M}_0$.

According to a "seesaw" ordering scheme, as will be described hereinafter, when the number of columns, c, is even, $c-2=2$ spare nodes are added to the original $4\times 4$ mesh. Obviously, more edges are present in FIG. 2A in comparison to FIG. 1B. For example, node 3 has two edges in FIG. 1B but four edges in FIG. 2A.

FIG. 2B depicts a diagonal graph with 18 nodes and offsets $\{3, 4, 5\}$. It is apparent from a node-by-node comparison that this diagonal graph has exactly identical node labels and edge connections as the two-dimensional mesh with two spare nodes shown in FIG. 2A. In other words, these two graphs are isomorphic or topologically equivalent. For instance, node 0 in either figure is connected to nodes 3, 4 and 5, while node 6 in either figure is connected to nodes 1, 2, 3, 9, 10 and 11.

As a further illustration, A graph of N nodes can be represented by an $N \times N$ binary adjacency matrix, in which the matrix element at row i and column j, where $0 \leq i, j < N$, has a value of 1 if there is an edge between node i and node j in the graph, and has a value of 0 if there is no such edge. FIG. 2C shows an example of the adjacency matrix for the diagonal graph in FIG. 2B, where node 0 is connected to nodes 3, 4 and 5, node 1 is connected to nodes 4, 5 and 6, and so on. The "internal" nodes are connected to up to six nodes, e.g., node 5 is connected to nodes 0, 1, 8, 9, and 10, and so on. As is shown in FIG. 2C, there are two "diagonal" bands in the adjacency matrix for the diagonal graph shown in FIG. 2B.

In short, except for the lower- and higher-numbered nodes, each "internal" node l in FIG. 2B is connected to nodes $l\pm 3, l\pm 4$ and $l\pm 5$ in both directions around the diagonal graph.

Figure 3A:
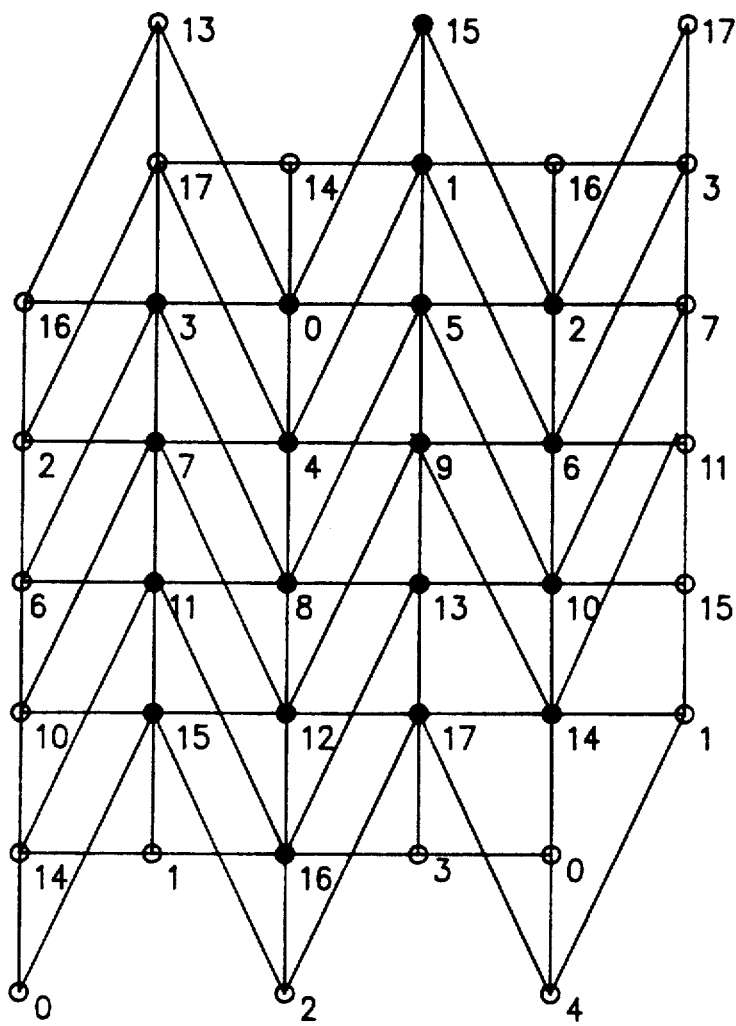
FIG. 3A depicts the two-dimensional mesh shown in FIG. 1B modified with two spare nodes as well as extra edges and labeled in accordance with a circulant graph model.
Figure 3B:
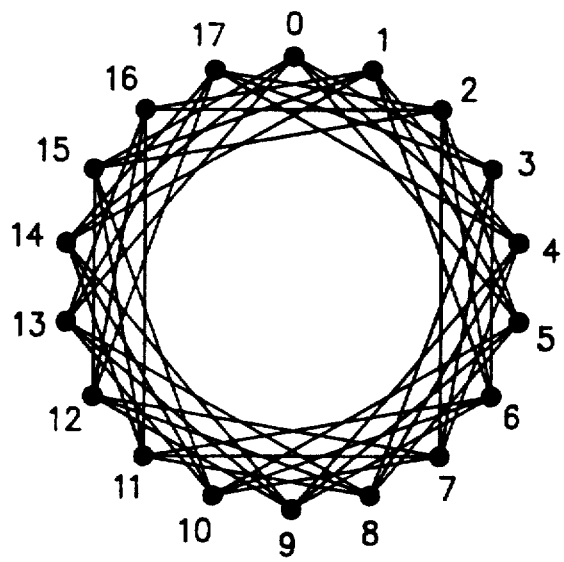
FIG. 3B depicts the circulant graph corresponding to the two-dimensional mesh shown in FIG. 3A.

FIG. 3A depicts a zero-fault-tolerant mesh $\hat{M}_0$, constructed in accordance with a circulant graph model, with the addition of two spare nodes (1 and 16) to the mesh depicted in FIG. 1B. Again for clarity, some image of nodes, represented by empty circles, are added for the wraparound connections. FIG. 3B depicts the circulant graph with 18 nodes and offsets $\{3, 4, 5\}$ corresponding to $\hat{M}_0$ in FIG. 3A. This circulant graph contains the diagonal graph in FIG. 2B as a subgraph. The difference between a diagonal graph and a circulant graph is that the former does not include several wraparound edges of the latter. For instance, in the circulant graph, node O is connected not only to nodes 3, 4 and 5 but also to nodes 13, 14 and 15, whereas in the diagonal graph, node 0 is connected to nodes 3, 4 and 5 only. This special property of the diagonal graph is one of the novelties of a specific embodiment of the invention whereby a fault-tolerant graph with a small degree can be constructed. FIG. 3C is the adjacency matrix for the circulant graph in FIG. 3B.

The graphs depicted in FIGS. 2B and 3B are represented for the sake of illustration only. What is important to note, for the sake of understanding the invention, is that a circulant graph of the type depicted in FIG. 3B, when constructed from a given mesh and a set of additional spare nodes, may serve as a model for fabricating an equivalent mesh which is fault-tolerant.

Having laid the foundation for what follows, the details of how to construct fault-tolerant graphs, and hence the corresponding fault-tolerant meshes, will first be presented in terms of a general two-dimensional mesh, followed by practical examples of fault-tolerant two-dimensional meshes. In the following embodiments of the invention, M is an $r \times c$ mesh with N nodes, i.e., $N=rc$. $\hat{M}_k$ is defined as the corresponding k-fault-tolerant (k-FT) mesh.

According to one aspect of the invention, a mesh M is constructed in a row-major order, such that each node (i,j) is labeled $ic+j$. The mesh thus constructed is a subgraph of a circulant graph with N nodes and offsets $\{1,c\}$. The circulant graph with $N+k$ nodes (i.e., $m=k$) and offsets $\{1,2, \ldots, k+1, c, c+1, \ldots, c+k\}$ is a k-FT graph with M being the target graph. The degree of the k-FT graph is at most $4k+4$. An example of a $5 \times 8$ mesh constructed in the row-major order is shown in FIG. 4A.

According to another aspect of the invention, a mesh M is constructed in an antidiagonal-major order, such that each node (i,j) is labeled $((i+j) \bmod r)c+j$. The mesh thus constructed is a subgraph of a circulant graph with N nodes and offsets $\{c, c+1\}$. The circulant graph with $N+k$ nodes (i.e., $m=k$) and offsets $\{c, c+1, \ldots, c+k+1\}$ is a k-FT graph with M being the target graph. The degree of the k-FT graph is at most $2k+4$. An example of a $5 \times 8$ mesh constructed in an antidiagonal-major order is shown in FIG. 4B. It is also noted that the mesh can be constructed in accordance with apparent variations of an antidiagonal-major ordering, e.g., a diagonal-major ordering.

According to still another aspect of the invention, a mesh M is constructed in an interleaved antidiagonal-major order. The mesh thus constructed has N nodes and offsets $\{a, a+1, \ldots, b\}$, where $a = \lceil rc/2 \rceil - \lceil r/2 \rceil$ and $b = \lceil rc/2 \rceil + \lfloor r/2 \rfloor$, and is a subgraph of a circulant graph with $N+k$ nodes (i.e., $m=k$) and offsets $\{a, a+1, \ldots, b+k\}$. The circulant graph is a k-FT graph with M being the target graph. The degree of the k-FT graph is at most $k+r+1$ when r is odd and c is even, and at most $k+r$ otherwise. An example of a $5 \times 8$ mesh constructed in an interleaved antidiagonal-major order is shown in FIG. 4C. It is also noted that the mesh can be constructed in accordance with apparent variations of an interleaved antidiagonal-major ordering, e.g., an interleaved diagonal-major ordering.

According to yet another aspect of the invention, k-FT graphs with smaller degrees can be constructed in accordance with combinations of the aforementioned mesh-construction techniques. Depending on the value or r, there are at least three additional techniques whereby a mesh M can be transformed into a subgraph of a circulant graph.

In the first case, r is odd. Each node (i,j) is labeled $f(i+j)c+j$ where $f(i)=(i(r-1)/2)$ mod r. The mesh thus constructed becomes a subgraph of a circulant graph with N nodes and offsets $\{(r-1)c/2, (r-1)c/2+1\}$. The circulant graph with N+k nodes and offsets $\{(r-1)c/2, (r-1)c/2+1, \ldots ,(r-1)c/2+k+1\}$ is a k-FT graph with M being the target graph. The degree of the k-FT graph is at most $2k+4$ when r is odd and $k \leq c-3$, and is at most $c+k+1$ when r is odd and $k>c-3$. FIG. 5A depicts an example of a $7 \times 4$ mesh constructed in accordance with this technique.

In the second case, r mod 4=0. Each node (i,j) is labeled $f(i+j)c+j$ where $f(i)=((r/2-1)i)$ mod r. The mesh thus constructed becomes a subgraph of a circulant graph with N nodes and offsets $\{(r/2-1)c,(r/2-1)c+1\}$. The circulant graph with N+k nodes and offsets $\{(r/2-1)c,(r/2-1)c+1, \ldots, (r/2-1)c+k+1\}$ is a k-FT graph with M being the target graph. The degree of the k-FT graph is at most $2k+4$ when r mod 4=0 and $k \leq 2c-3$, and is at most $2c+k+1$ when r mod 4=0 and $k>2c-3$. FIG. 5B depicts an example of an $8 \times 4$ mesh constructed in accordance with this technique.

In the third case, r mod 4=2. Each node (i,j) is labeled $f(i+j)c+j$ where $f(i)=((r/2-2)i)$ mod r. The mesh thus constructed becomes a subgraph of circulant graph with N nodes and offsets $\{(r/2-2)c,(r/2-2)c+1\}$. The circulant graph with N+k nodes and offsets $\{(r/2-2)c, (r/2-2)c+1, \ldots, (r/2-2)c+k+1\}$ is a k-FT graph with M being the target graph. The degree of the k-FT graph is at most $2k+4$ when r mod 4=2 and $k \leq 4c-3$, and is at most $4c+k+1$ when r mod 4=2 and $k>4c-3$. FIG. 5C depicts an example of a $10 \times 4$ mesh constructed in accordance with this technique.

According to a further aspect of the invention, $\hat{M}_k$ consists of N+m nodes that are numbered from 0 to N+m-1, where $\hat{M}_k$ can be represented as a circulant graph in which the number of spare nodes m is determined as a function of whether c is odd or even. That is, for the number of spare nodes there are two cases.

In case one, c is odd. In this case $m=k+c-1$, and the nodes are labeled from 0 to $rc+k+c-2$. In case two, c is even. In this case $m=k+c-2$, and the nodes are labeled from 0 to $rc+k+c-3$.

The edges of the fault-tolerant mesh $\hat{M}_k$ are defined as a function of whether k is odd or even (i.e., for the definition of edges there are also two cases.)

In the first case, k is odd. In this case every node has a degree of $k+5$. The edges are defined by the following set of offsets:

$$\{c+j | -1 \leq j \leq (k+1)/2\}.$$

In the second case, k is even. In this case every node has a degree of $k+6$. The edges are defined by the following set of offsets:

$$\{c+j | -1 \leq j \leq (k+2)/2\}.$$

A mesh architecture $\hat{M}_k$ constructed in accordance with the above-described circulant graph will be k-fault-tolerant and therefore be guaranteed to contain the target mesh M in the presence of up to k faults, regardless of the distribution of faults.

A class of two-dimensional meshes of practical significance is the very common case of an $n \times n$ mesh, such as the $4 \times 4$ mesh in FIGS. 1A and 1B. The mesh architecture $\hat{M}_0$ in FIG. 2A, which is the base graph and tolerates zero faults, contains the $4 \times 4$ mesh M as a subgraph. Each node (i,j) of M in FIG. 1A is labeled as node $((i+(j+1) \text{ mod } 2) c+j-1)$ in $\hat{M}_0$.

Figure 6A:
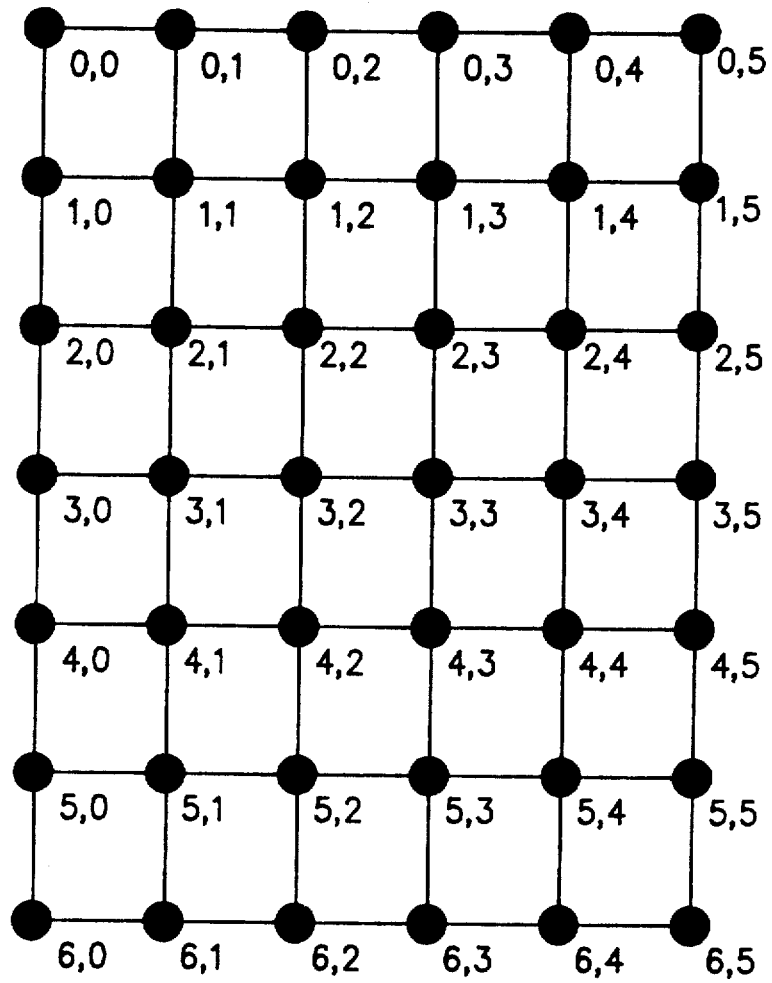
FIG. 6A depicts a prior art 7×6 mesh in which nodes are labeled conventionally.
Figure 6B:
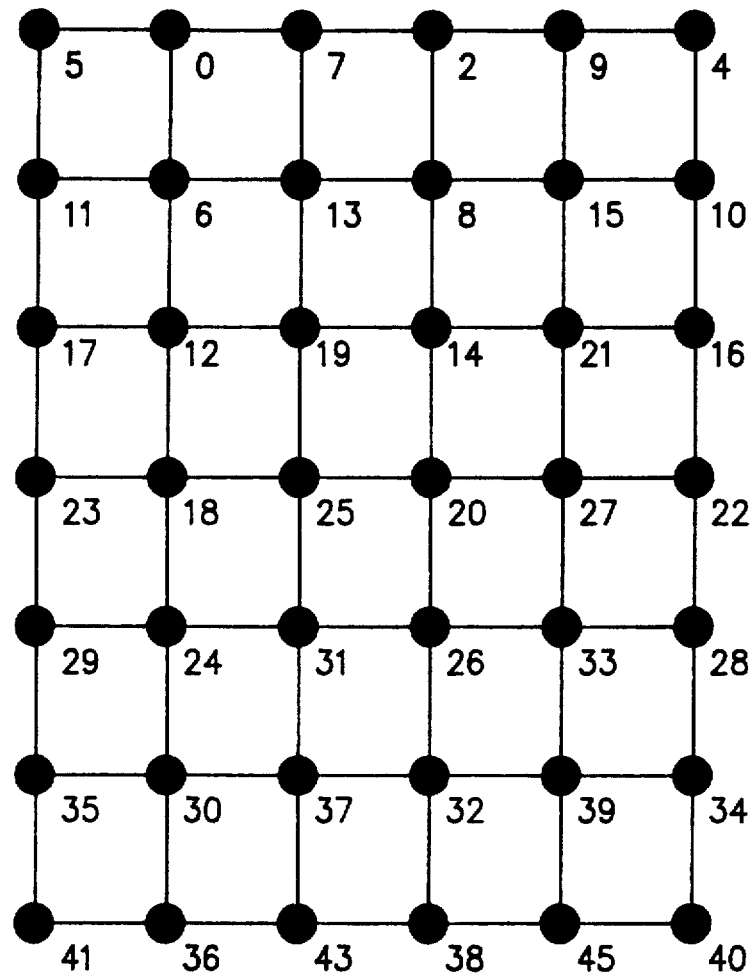
FIG. 6B depicts the same 7×6 mesh shown in FIG. 6A labeled in accordance with yet another novel labeling scheme.

As a further example, consider the case of an $r \times c$ mesh, where $r \neq c$. FIG. 6A depicts a $7 \times 6$ two-dimensional mesh with conventionally numbered nodes. FIG. 6B depicts the same $7 \times 6$ mesh shown in FIG. 6A renumbered in accordance with the above-described novel scheme.

Figure 7:
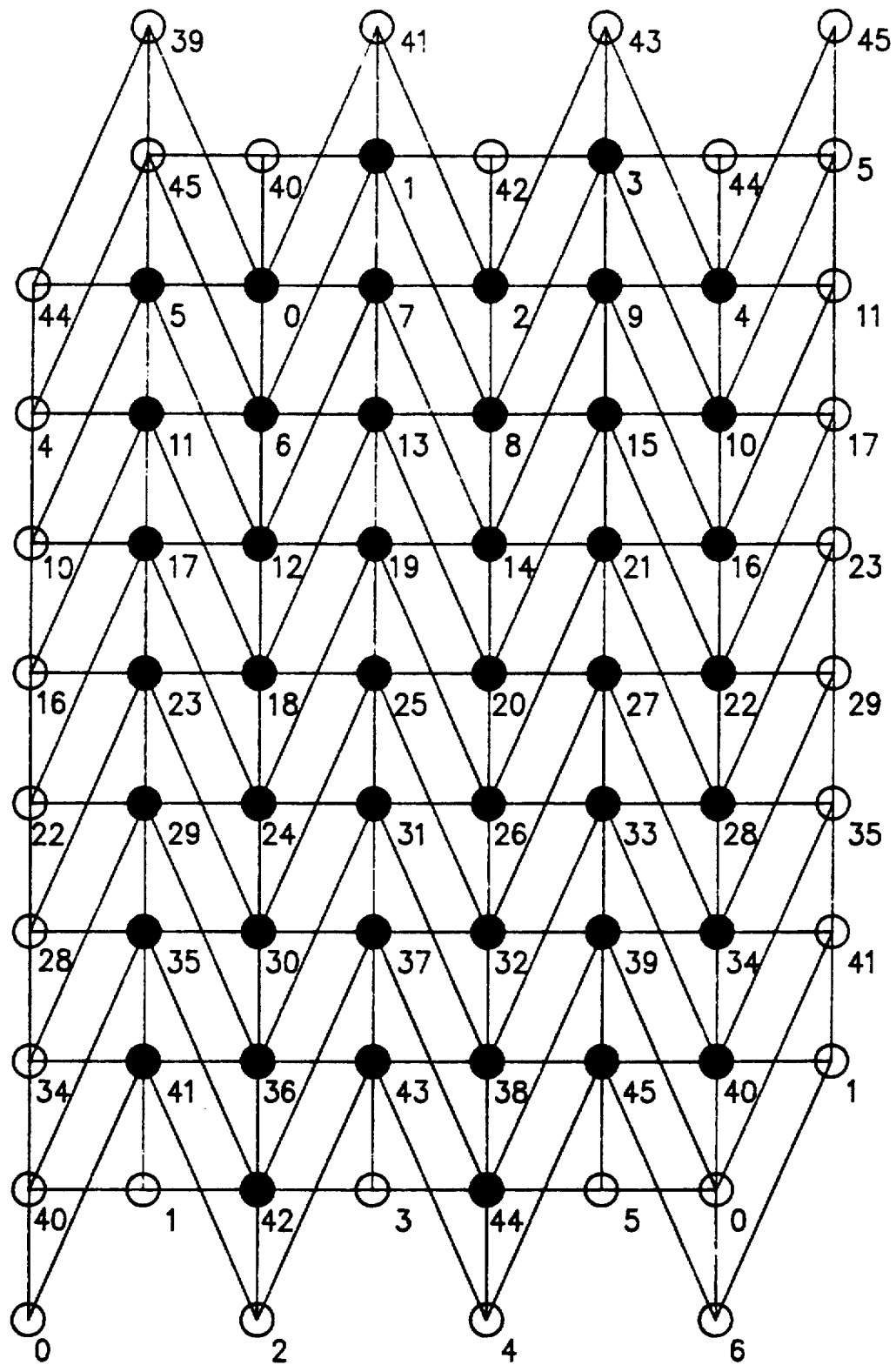
FIG. 7 depicts the base graph $\hat{M}_0$ with offsets $\{5, 6, 7\}$ which contains the 7×6 mesh shown in FIG. 6B as a subgraph.

The base graph $\hat{M}_0$ having four spare nodes and offsets $\{5, 6, 7\}$ for the $7 \times 6$ mesh is depicted in FIG. 7. The $7 \times 6$ mesh can be viewed as a subgraph of $\hat{M}_0$. Note also that, except for the four spare nodes (1, 3, 42, 44), the labels of nodes in $\hat{M}_0$ are identical to those in FIG. 6B.

Figure 8:
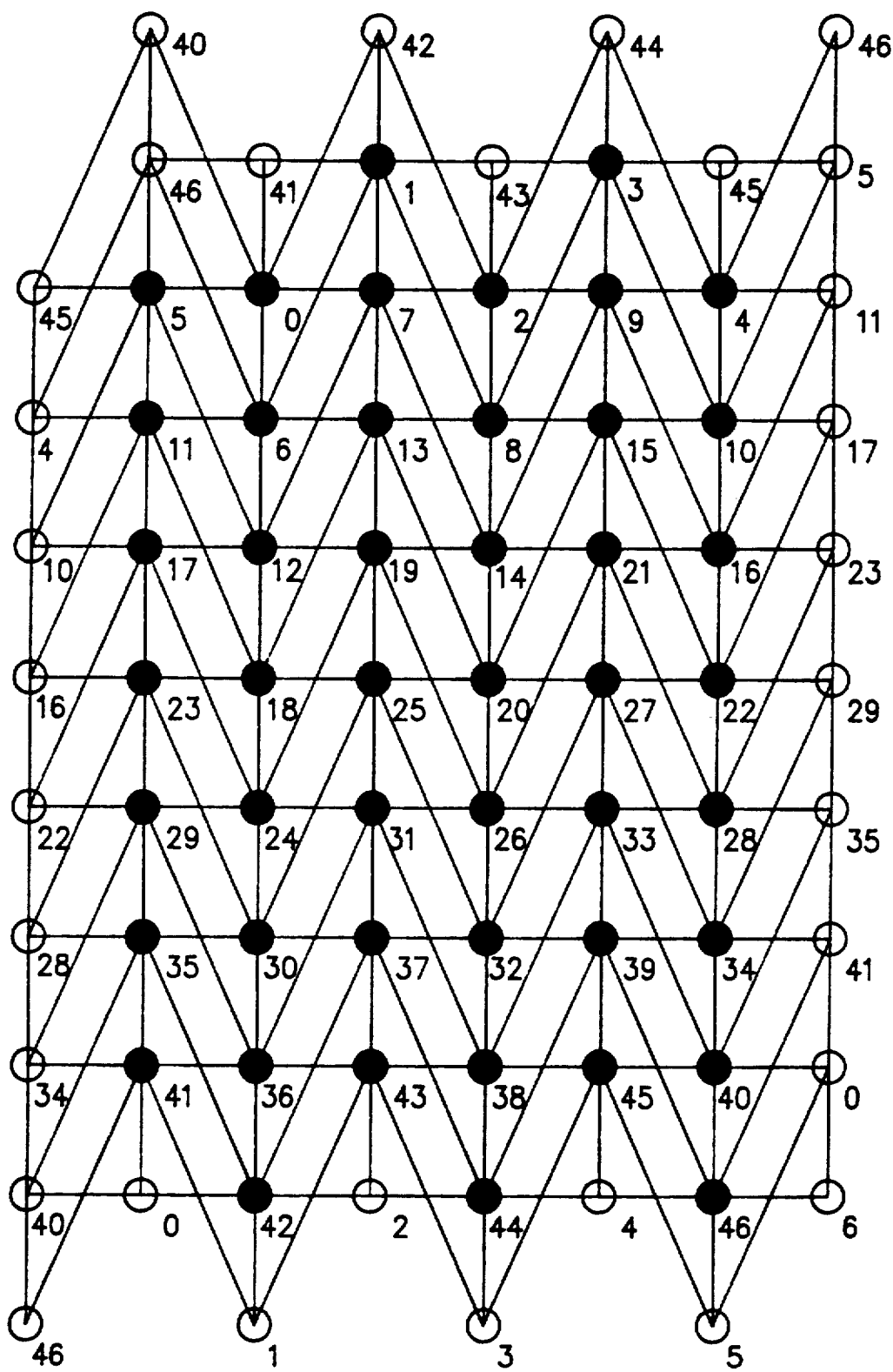
FIG. 8 depicts the one-fault-tolerant (1-FT) mesh with one extra node added to the graph shown in FIG. 7.

FIG. 8 depicts the 1-FT (one-fault-tolerant) mesh, $\hat{M}_1$, with five spare nodes added to the $7 \times 6$ mesh shown in FIG. 6B. Each node is linked to 6 other nodes (degree 6). It is noted that $\hat{M}_1$ has a new node (number 46) as compared to $\hat{M}_0$ in FIG. 7.

In summary, according to this aspect of the invention, a fault-tolerant mesh $\hat{M}_k$ can be constructed, in a "seesaw" manner, to sustain up to k faults, and can be reconfigured without the use of switches to form the mesh M. The "seesaw" ordering is so called because the the nodes, when labeled sequentially, appear in a topologically "seesaw" manner, as is obviously shown in FIGS. 6B. Thus, $\hat{M}_k$ comprises (a) N+m nodes of the same type, where $m=k+c-1$ for c odd, and $m=k+c-2$ for c even, the nodes being arranged as a circulant graph; and (b) a plurality of edges for said circulant graph where, for k odd, the edges are defined by the union of the following set of offsets:

$$\{c+j | -1 \leq j \leq (k+1)/2\};$$

and for k even, the edges are defined by the union of the following set of offsets:

$$\{c+j | -1 \leq j \leq (k+2)/2\}.$$

According to a still further aspect of the invention, the fault-tolerant mesh $\hat{M}_k$ (with N+m nodes), after the removal of up to k faults, contains not only an $r \times c$ "healthy" mesh but also an additional number of $\lceil c/2 \rceil -1$ healthy nodes attached to the top row as well as an additional number of $\lceil c/2 \rceil -1$ healthy nodes attached to the bottom row. It is further noted that these extra nodes are attached to the boundary and can serve the purpose of I/O nodes (such as drivers for I/O devices and disks).

The above-described "seesaw" technique for achieving fault-tolerance in two-dimensional meshes can be generalized to d-dimensional meshes while limiting the number of spare nodes to approximately the number of nodes in the shortest axis plus the pre-determined number of faults to be tolerated.

According to one aspect of the invention, if M is a d-dimensional mesh with $N=n_1 \times n_2 \times \ldots \times n_d$ nodes, where $n_d \geq 3$ and $n_1 \leq n_2 \leq \ldots \leq n_d$, and $\hat{M}_k$ is defined as the corresponding k-FT mesh, then $\hat{M}_k$ consists of N+m nodes that are numbered from 0 through N+m-1. $\hat{M}_k$ can be represented as a circulant graph in which the nodes are defined as a function of whether $n_1$ is odd or even. If $n_1$ is odd, $m = k + n_1 - 1$. If $n_1$ is even, $m = k + n_1 - 2$.

The edges are defined as a function of whether k is odd or even. In case one, k is odd. Every node has a degree $(d-1)k + d + 3$. The edges are defined by the union of the following sets of offsets:

$$\left\{ n_1 + j \mid -1 \leq j \leq \frac{k+1}{2} \right\},$$

$$\left\{ n_1 n_2 + j \mid 0 \leq j \leq \frac{k-1}{2} \right\},$$

$$\left\{ n_1 n_2 n_3 + j \mid 0 \leq j \leq \frac{k-1}{2} \right\}, \ldots,$$

and up to $$\left\{ n_1 n_2 \ldots n_{d-1} + j \mid 0 \leq j \leq \frac{k-1}{2} \right\}.$$

In case two, k is even. Every node has a degree $(d-1)k + 2d + 2$. The edges are defined by the union of the following sets of offsets:

$$\left\{ n_1 + j \mid -1 \leq j \leq \frac{k+2}{2} \right\},$$

$$\left\{ n_1 n_2 + j \mid 0 \leq j \leq \frac{k}{2} \right\},$$

$$\left\{ n_1 n_2 n_3 + j \mid 0 \leq j \leq \frac{k}{2} \right\}, \ldots,$$

and up to $$\left\{ n_1 n_2 \ldots n_{d-1} + j \mid 0 \leq j \leq \frac{k}{2} \right\}.$$

Those skilled in the art will readily appreciate that when $d = 2$, the above-described results yield the same definitions for the two-dimensional meshes given hereinabove. Those skilled in the art will also appreciate that $\hat{M}_k$ is a k-FT mesh with the target graph being the given d-dimensional mesh M.

Those skilled in the art will recognize that the foregoing generalization from two-dimensional meshes to d-dimensional meshes ($d < 2$) in accordance with the "seesaw" ordering technique can be performed in accordance with any one of the above-identified ordering schemes such as row-major, antidiagonal-major, interleaved antidiagonal-major, and "seesaw" ordering, or any combinations thereof.

Next, a systematic way to relabel a fault-tolerant two-dimensional mesh in the presence of faults is presented. The result of this renaming (relabeling) process, given k faults in the k-FT mesh $\hat{M}_k$, is an identification of the healthy two-dimensional r×c target mesh M. The process identifies and defines a healthy r×c mesh by assigning new labels to the nodes. All the necessary edges exist to perform this process given a fault-tolerant mesh constructed (or provided) in accordance with the teachings of the invention as set forth hereinabove.

The k nodes in $\hat{M}_k$ that are faulty are identified and provided as an input to the process. These nodes correspond to the physical components that are faulty in $\hat{M}_k$. Those skilled in the art will recognize that the techniques presented hereinafter are operative independent of whether the k faults are identified and presented as input for the renaming process in real time or on an off-line basis. Methods and apparatus for detecting faulty nodes are well known to those skilled in the art and do not constitute a part of the invention per se.

In cases where there are x faulty nodes where $x < k$, according to the invention, any $k - x$ healthy nodes are arbitrarily selected and considered to be faulty. It should be recalled that the nodes in a circulant graph (corresponding to $\hat{M}_k$) can be numbered 0 through $N + m - 1$. Since these nodes are ordered cyclically, nodes $N + m - 1$ and 0 are adjacent. Thus, when the nodes are traversed in ascending order, node 0 follows node $N + m - 1$; when they are traversed in descending order, node $N + m - 1$ follows node 0.

The renaming process contemplated by the invention includes three steps (or equivalent variants thereof) as set forth hereinafter. By "equivalent variants" it is meant that where the illustrative embodiment of the invention refers, for example, to "counters", any means for keeping track of the values being counted may be substituted for physical counters per se; where all counters are incremented, equivalent results may be obtained where all counters are instead decremented, etc. The specific terms used in the following description of the renaming process are presented for the sake of illustration only and are not intended to limit the scope of the invention which will be defined hereinafter in the claims.

The first step in the aforementioned three-step process utilizes two counters: one to count faulty nodes and one to count non-faulty nodes. According to the first process step, the routine described hereinafter is performed for all values of i where $0 \leq i \leq N + m - 1$.

First, both counters are cleared (for example, set to 0). Next, according to one embodiment of the invention, the nodes are visited in a descending order starting with node i. As each node is visited, the appropriate counter is incremented. That is, if the visited node is faulty, the counter for faulty nodes is incremented, and if the visited node is non-faulty, the counter for non-faulty nodes is incremented. Thus, node i is the first node to be visited. The appropriate counter is set according to whether node i is faulty or non-faulty.

The counter for non-faulty nodes is checked after it is incremented. If this counter is equal to $c + 2$, the process of visiting the nodes in descending order is terminated, and the counter for faulty nodes is checked. If the counter for faulty nodes is greater than k/2, node i is designated as "marked"; while if it is less than or equal to k/2, node i is designated as being "unmarked". The non-faulty marked nodes are those which have a large number or a majority of faulty nodes preceding them, and must be assigned to the first rows of the non-faulty mesh.

The second step of the process determines which of the non-faulty nodes should be node 0 in the reconfigured non-faulty mesh. The second step consists of two phases and uses a single counter.

Phase one begins, according to a preferred embodiment of the invention, by clearing the counter (for example, setting it to 0). Then the nodes are visited in descending order, starting with any arbitrarily selected node i. As each node is visited, the node is checked to see whether it is faulty and whether it is marked. If the node is non-faulty and unmarked, the counter is incremented. If the node is non-faulty and marked, the counter is cleared (such as setting it to 0). If the node is faulty, the counter is left unchanged.

Next, the counter is checked and Phase One is terminated if the counter is greater than or equal to N/2. The node that is being visited when the counter reaches N/2, according to the preferred embodiment of the invention, is called node a.

In Phase Two, the nodes are visited in ascending order beginning with node a. Phase Two terminates when a non-faulty and marked node is encountered. According to the invention, this non-faulty marked node is designated as node b.

The third step of the renaming process assigns numbers (identifiers) to the non-faulty nodes. The nodes are visited in ascending order, starting with node b, and the non-faulty nodes are assigned the values 0, 1, . . . , $N+m-k-1$ in order. Thus node b is assigned 0, the next non-faulty node that is visited is assigned 1, and the last non-faulty node that is visited is assigned $N+m-k-1$. These numbers correspond to the numbering of the base graph $\dot{M}_0$.

The correspondence of a label l to the conventional labeling of the mesh in terms of coordinates (i,j) is defined by the labeling functions set forth hereinabove for each of the ordering scheme. For example, given a mesh M constructed in a row-major order described hereinabove, node l ($l = ic + j$) can be reinstated in the conventional labeling (i,j), where $$i = \lfloor l/c \rfloor,$$

and $$j = l \bmod c.$$

As another example, for a mesh M constructed in a "seesaw" order as described hereinabove, the conventional labeling (i,j) can be reinstated by the following relationships:

$$j = (l+1) \bmod c,$$

and $$i = (l+1-j)/c - ((j+1) \bmod 2).$$

Nodes with label l for which $i<0$ or $i \geq r$ are omitted.

Those skilled in the art will recognize that similar relationships exist between the conventional labeling and the graph-based labeling for meshes constructed in accordance with various schemes such as antidiagonal ordering, interleaved antidiagonal ordering, etc., as well as combinations of any of the ordering schemes.

Figure 9A:
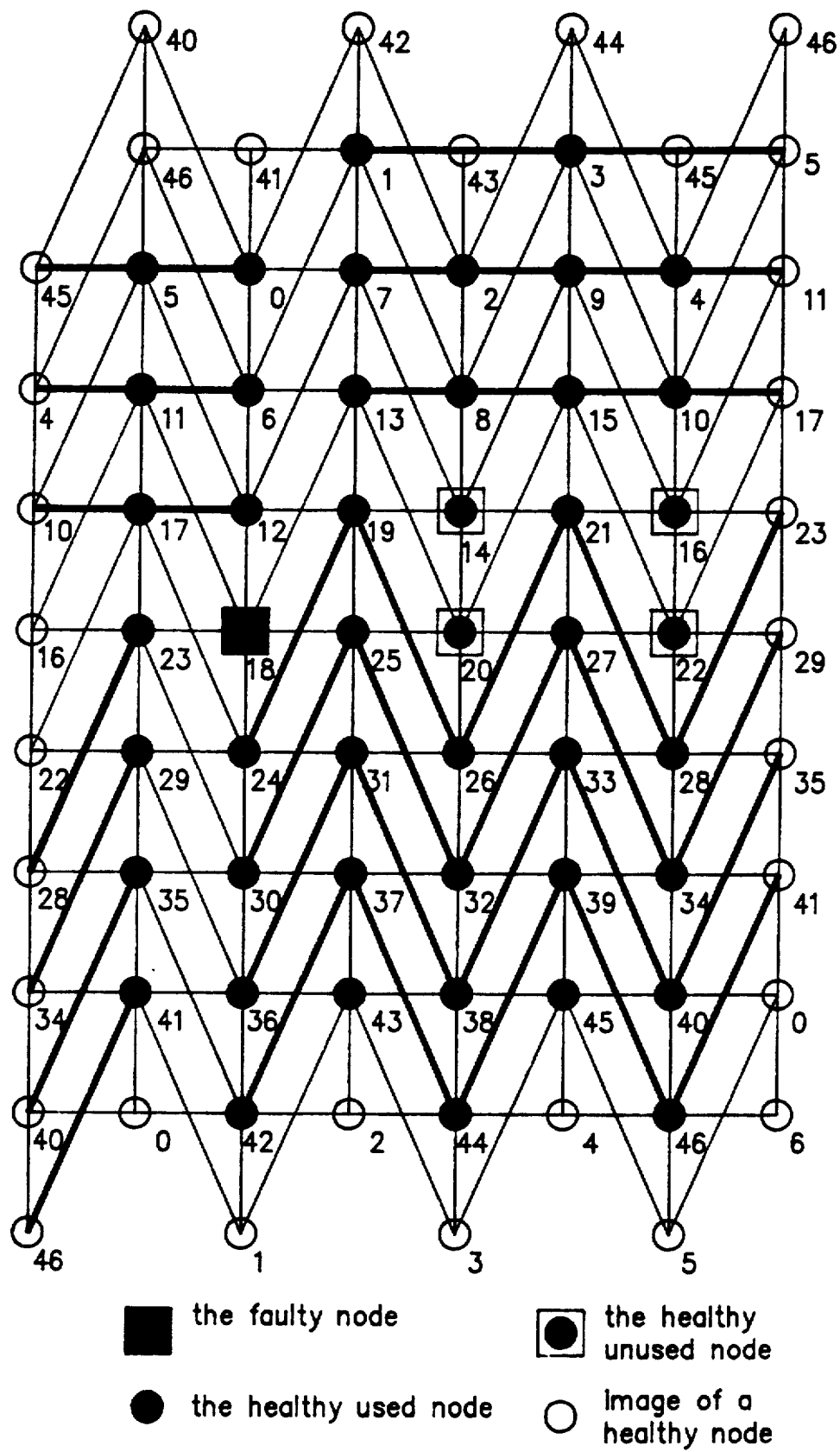
FIG. 9A depicts a version of the graph shown in FIG. 8 reconfigured in accordance with the renaming process portion of the invention upon finding a faulty node 18.

It should be noted that in the case of a single fault the above process will result in a new labeling that starts immediately after the fault. For example, with reference to FIG. 8, assume node 18 of the 7×6 1-FT mesh is faulty. FIG. 9A presents a new version of the same mesh in FIG. 8 after nodes 14, 16, 20 and 22 are excluded from the reconfigured mesh. Each row in the reconfigured mesh is shown by a thick line, with proper wraparound wherever necessary.

Figure 9B:
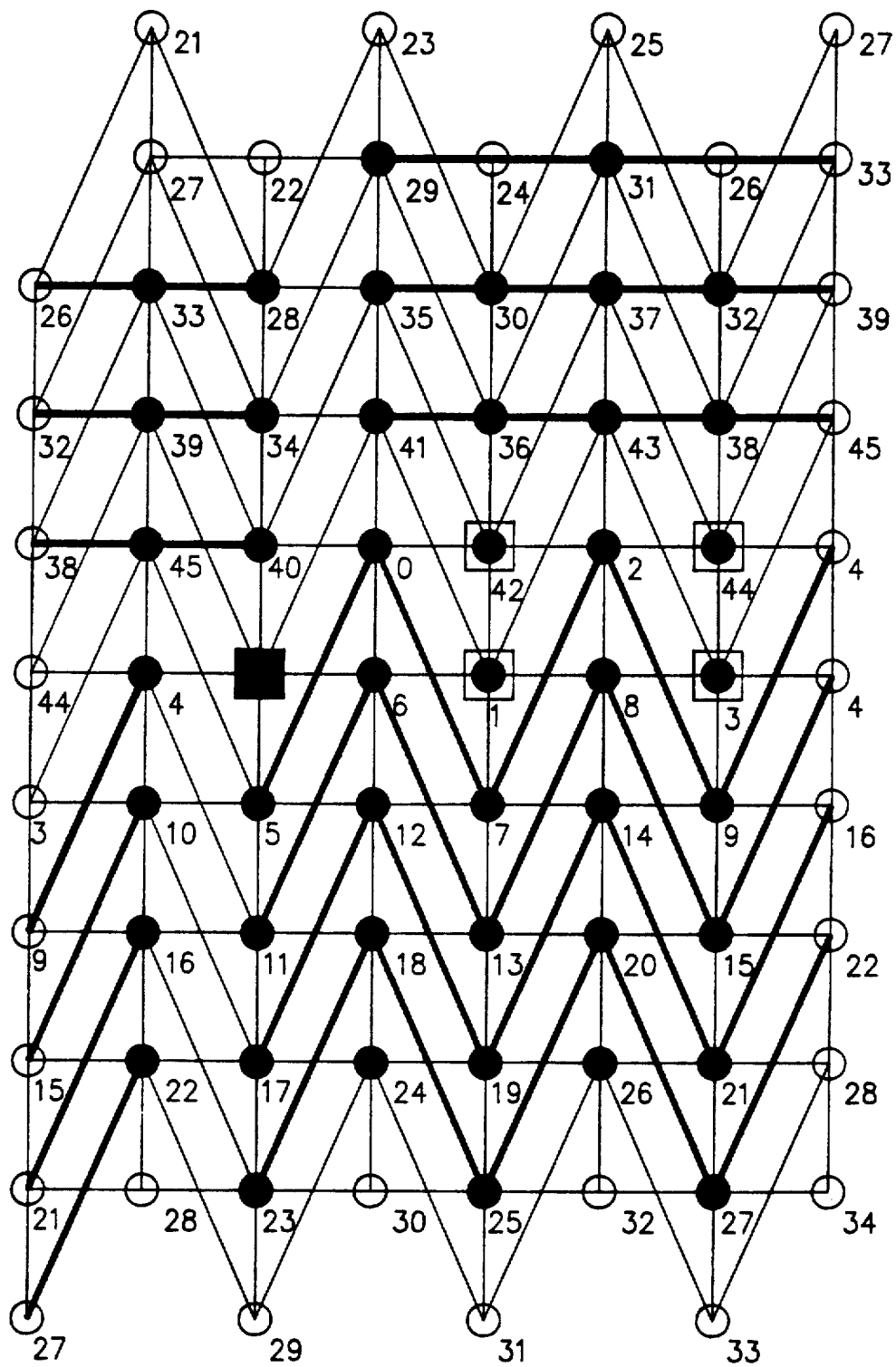
FIG. 9B depicts the same reconfigured mesh shown in FIG. 9A with new labels for the healthy nodes used in the reconfigured mesh in accordance with the renaming process portion of the invention.

FIG. 9B depicts the same reconfigured mesh shown in FIG. 9A after the above-described renaming process is performed. Node 19 in FIG. 9A now becomes node 0 in the reconfigured, relabeled mesh.

FIGS. 10A–10E depict a simplified representation of the meshes shown in FIGS. 6B, 7,8,9A and 9B, respectively. For clarity, edges are omitted in the meshes shown in FIGS. 10A–10E. Thus, FIGS. 6B and 10A both represent a 7×6 mesh. FIGS. 7 and 10B both show a base graph corresponding to said 7×6 mesh. FIGS. 8 and 10C have in each another extra node added to the base graph, making the graph a 1-FT mesh. FIGS. 9A and 10D represent the reconstruction of a healthy target mesh after node 18 becomes a faulty node. FIGS. 9B and 10E show the reconstructed mesh after the renaming process. Node 18 in FIG. 10D (represented by the blackened block) is excluded from the healthy target mesh, and remains excluded in FIG. 10E. Nodes 14, 16, 20 and 22 are also excluded from the healthy target mesh in FIG. 10D, and remain excluded in FIG. 10E, albeit each having a new label after the renaming process.

As a further example, FIG. 11A depicts a 2-FT (two-fault-tolerant) mesh based upon the 5×8 mesh which is shown in FIG. 4B and which is constructed in an antidiagonal-major order. Two extra nodes (40 and 41) are shown topologically located on an antidiagonal to the orginal mesh. FIG. 11B shows two faulty nodes 11 and 21, which are represented by two blackened blocks. FIG. 11C presents the reconstructed, relabeled healthy target mesh excluding the two faulty nodes.

Given the above-described examples on meshes constructed in a "seesaw" order and in an antidiagonal order, those skilled in the art will recognize that fault-tolerance can be achieved in meshes constructed in accordance with other ordering schemes of the invention.

The above-described techniques for achieving fault-tolerance in meshes can be implemented in a completely straightforward manner, particularly for small values of k. For higher values of k, it is possible to use a switching mechanism to take care of the increase in the degree.

Again according to the invention, the renaming process for locating the healthy d-dimensional mesh M in the k-FT mesh $\dot{M}_k$ in the presence of up to k faults is similar to the renaming process described hereinabove for locating the healthy two-dimensional mesh, with the exceptions described hereinafter.

In the first step described hereinabove for two-dimensional meshes, replace $c+2$ by $j, j = 2 + n_1 n_2 \ldots n_{d-1}$.

The second step described hereinabove for two-dimensional meshes can be followed without any change for d-dimensional meshes.

For d-dimensional meshes constructed according to a "seesaw" ordering scheme, the third step described hereinabove for two-dimensional meshes can be followed except for the label l corresponding to the coordinates of the mesh $(i_1, i_2, \ldots, i_d)$:

$$i_1 = (l+1) \bmod n_1,$$

$$i_2 = x \bmod n_2,$$

where $x = \lfloor (l+1)/i_1 \rfloor - ((i_1 + 1) \bmod 2),$ $$i_3 = \lfloor \frac{x}{n_2} \rfloor \bmod n_3,$$

$$i_4 = \lfloor \frac{x}{n_2 n_3} \rfloor \bmod n_4, \ldots.$$

-continued and up to $i_{d-1} = \lfloor \frac{x}{n_2 n_3 \ldots n_{d-2}} \rfloor \mod n_{d-1}$, and $i_d = \lfloor \frac{x}{n_2 n_3 \ldots n_{d-1}} \rfloor$.

Nodes with label 1 for which $i_d < 0$ or $i_d \geq n_d$ are omitted.

Those skilled in the art will recognize a step similar to that the afore-described third step for locating a healthy d-dimensional mesh constructed in a "seesaw" ordering can be performed for each of the d-dimensional meshes constructed in accordance with various schemes such as row-major ordering, antidiagonal ordering, interleaved antidiagonal ordering, etc., as well as combinations of any of the ordering schemes.

Those skilled in the art will also recognize that the foregoing novel techniques of constructing, labeling and relabeling two-dimensional or d-dimensional meshes in accordance with any one of the above-identified ordering schemes such as row-major, antidiagonal-major, interleaved antidiagonal-major, and "seesaw" ordering, or any combinations thereof, is not limited to typical 4-neighbor (or 2d-neighbor) mesh structures. Thus, the above techniques can be applied to any mesh-like or grid-like architecture such that the architecture is a subgraph of a diagonal graph or a circulant graph with a set of offsets that are clustered to only a few groups of consecutive numbers.

Examples of other mesh-like or grid-like architectures include the 6-connected (i.e., hexagonal) meshes, 8-connected meshes, tori, single-twisted tori and double-twisted tori, etc. Each node in a 6-connected mesh is connected to two horizontal, two diagonal and two antidiagonal neighbors, provided such neighbors exist. The 6-connected mesh thus has a hexagonal boundary. Each node in an 8-connected mesh is connected not only to those typical neighbors in a d-dimensional mesh but also to those diagonal and antidiagonal neighbors, provided such neighbors exist. An $r \times c$ torus can be defined as an $r \times c$ mesh with added wraparound edges between the first and last rows and between the first and last columns.

What have been described are methods and apparatuses for tolerating faults in mesh architectures meeting all of the objectives set forth hereinabove. Those skilled in the art will recognize that the foregoing description has been presented for the purposes of illustration and description only. It is not intended to be exhaustive or to limit the invention to the precise form disclosed, and obviously many modifications and variations are possible in light of the above teachings.

The embodiments and examples set forth herein were presented in order to best explain the principles of the instant invention and its practical application to thereby enable others skilled in the art to best utilize the instant invention in various embodiments and various modifications as are suited to the particular use contemplated.

What is claimed is:

1. A fault-tolerant mesh $\hat{M}_k$ comprising:
   (a) N+m nodes, the mesh $\hat{M}_k$ being capable of supporting a target mesh M from which a mesh M may be defined, the mesh M having N nodes, m being a number of extra nodes in the mesh $\hat{M}_k$, wherein the nodes may be represented by one of a diagonal graph and a circulant graph, each node has an identifier assigned thereto, the value of each identifier being determined with respect to the graph, the fault-tolerant mesh $\hat{M}_k$ being able to sustain up to k faults while facilitating definition of the mesh M; and
   (b) a plurality of edges connected between respective ones of the nodes in accordance with a connection pattern defined in terms of the identifiers assigned to the nodes and the positions of the nodes in the graph; wherein at least one of the extra nodes is an input/output node.

2. A fault-tolerant mesh $\hat{M}_k$ comprising:
   (a) N+m nodes, the mesh $\hat{M}_k$ being capable of supporting a target mesh M from which a mesh M may be defined, the mesh M having N nodes, m being a number of extra nodes in the mesh $\hat{M}_k$, wherein the nodes may be represented by one of a diagonal graph and a circulant graph, each node has an identifier assigned thereto, the value of each identifier being determined with respect to the graph, the fault-tolerant mesh $\hat{M}_k$ being able to sustain up to k faults while facilitating definition of the mesh M; and
   (b) a plurality of edges connected between respective ones of the nodes in accordance with a connection pattern defined in terms of the identifiers assigned to the nodes and the positions of the nodes in the graph; wherein the mesh $\hat{M}_k$ is topologically equivalent to at least one hexagon.

3. A fault-tolerant mesh $\hat{M}_k$ comprising:
   (a) N+m nodes, the mesh $\hat{M}_k$ being capable of supporting a target mesh M from which a mesh M may be defined, the mesh M having N nodes, m being a number of extra nodes in the mesh $\hat{M}_k$, wherein the nodes may be represented by one of a diagonal graph and a circulant graph, each node has an identifier assigned thereto, the value of each identifier being determined with respect to the graph, the fault-tolerant mesh $\hat{M}_k$ being able to sustain up to k faults while facilitating definition of the mesh M; and
   (b) a plurality of edges connected between respective ones of the nodes in accordance with a connection pattern defined in terms of the identifiers assigned to the nodes and the positions of the nodes in the graph; wherein the mesh $\hat{M}_k$ is d-dimensional, and the number of nodes N is given by $N = n_1 \times n_2 \times \ldots \times n_d$, where each $n_i$ represents the size of the mesh M in the i-th dimension, with $n_1 \leq n_2 \leq \ldots \leq n_d$ and $n_d \geq 3$; and the number of extra nodes m is given by $m = k + n_1 - 1$ for $n_1$ being odd and $m = k + n_1 - 2$ for $n_1$ being even;

for k being odd, the edges are defined by the union of the following sets of offsets:

$$\left\{ n_1 + j \mid -1 \leq j \leq \frac{k+1}{2} \right\},$$

$$\left\{ n_1 n_2 + j \mid 0 \leq j \leq \frac{k-1}{2} \right\},$$

$$\left\{ n_1 n_2 n_3 + j \mid 0 \leq j \leq \frac{k-1}{2} \right\}, \ldots,$$

and up to

-continued $$\left\{ n_1 n_2 \ldots n_{d-1} + j \mid 0 \leq j \leq \frac{k-1}{2} \right\}, \text{ and}$$

for k being even, the edges are defined by the union of the following sets of offsets:

$$\left\{ n_1 + j \mid -1 \leq j \leq \frac{k+2}{2} \right\},$$

$$\left\{ n_1 n_2 + j \mid 0 \leq j \leq \frac{k}{2} \right\}$$

$$\left\{ n_1 n_2 n_3 + j \mid 0 \leq j \leq \frac{k}{2} \right\}, \ldots,$$

and up to $$\left\{ n_1 n_2 \ldots n_{d-1} + j \mid 0 \leq j \leq \frac{k}{2} \right\}.$$

4. A fault-tolerant mesh as recited in claim 3, wherein the degree of each node of the circulant graph and corresponding mesh $\hat{M}_k$ is $(d-1)k+d+3$ when k is odd and $(d-1)k+2d+2$ when k is even.

5. A fault-tolerant mesh $\hat{M}_k$ comprising:
(a) N+m nodes, the mesh $\hat{M}_k$ being capable of supporting a target mesh M from which a mesh M may be defined, the mesh M having N nodes, m being a number of extra nodes in the mesh $\hat{M}_k$, wherein the nodes may be represented by one of a diagonal graph and a circulant graph, each node has an identifier assigned thereto, the value of each identifier being determined with respect to the graph, the fault-tolerant mesh $\hat{M}_k$ being able to sustain up to k faults while facilitating definition of the mesh M; and
(b) a plurality of edges connected between respective ones of the nodes in accordance with a connection pattern defined in terms of the identifiers assigned to the nodes and the positions of the nodes in the graph; wherein the mesh $\hat{M}_k$ is d-dimensional, and the number of nodes n is given by $N = n_1 \times n_2 \times \ldots \times n_d$, where each $n_i$ represents the size of the mesh M the i-th dimension, with $n_1 \leq n_2 \leq \ldots \leq n_d$ and $n_d \geq 3$; and the mesh is two-dimensional, d=2, $n_1$ equals a number of columns c, and $n_2$ equals a number of rows r.

6. A fault-tolerant mesh as recited in claim 5 wherein, for k being odd, the edges are defined by the following set of offsets:

$$\{c+j \mid -1 \leq j \leq (k+1)/2\};$$

and for k being even, the edges are defined by the set of offsets:

$$\{c+j \mid -1 \leq j \leq (k+2)/2\}.$$

7. A fault-tolerant mesh as recited in claim 6, wherein the number of extra nodes m is given by $m=k+c-1$ for c being odd and $m=k+c-2$ for c being even.

8. A fault-tolerant mesh as recited in claim 6, wherein the degree of each node of the mesh $\hat{M}_k$ is k+5 when k is odd and k+6 when k is even.

9. A fault-tolerant mesh as recited in claim 5, wherein the number of extra nodes m equals the number of faults k which are to be tolerated.

10. A fault-tolerant mesh as recited in claim 9, wherein each node (i,j) of M is assigned an identifier in a row-major order.

11. A fault-tolerant mesh as recited in claim 10, wherein the connection pattern for the edges connecting the nodes is defined by a set of offsets $\{1, 2, \ldots, k+1, c, c+1, \ldots, c+k\}$.

12. A fault-tolerant mesh as recited in claim 10, wherein the degree of each node of the mesh $\hat{M}_k$ is at most $4k+4$.

13. A fault-tolerant mesh as recited in claim 9, wherein each node (i,j) of M is assigned an identifier in antidiagonal-major order.

14. A fault-tolerant mesh as recited in claim 13, wherein the connection pattern for the edges is defined by a set of offsets $\{c, c+1, \ldots, c+k+1\}$.

15. A fault-tolerant mesh as recited in claim 13, wherein the degree of each node of the mesh $\hat{M}_k$ is at most $2k+4$.

16. A fault-tolerant mesh as recited in claim 9, wherein each node of M is assigned an identifier in interleaved antidiagonal-major order.

17. A fault-tolerant mesh as recited in claim 16, wherein the connection pattern for the edges is defined by a set of offsets $\{a, a+1, \ldots, b+k\}$ where $a=rc/2-r/2$ and $b=rc/2+r/2$.

18. A fault-tolerant mesh as recited in claim 16, wherein the degree of each node of the mesh $\hat{M}_k$ is at most $k+r+1$ for r being odd and c being even, at most $k+r$ for r being even, and at most $k+r$ for c being odd.

19. A fault-tolerant mesh as recited in claim 9, wherein the number of rows r is odd, and each node (i,j) of M is assigned an identifier given by the formula $f(i+j)c+j$, with $f(i)=(i(r-1)/2) \mod r$.

20. A fault-tolerant mesh as recited in claim 19, wherein the connection pattern for the edges connecting the nodes is defined by a set of offsets $\{(r-1)c/2, (r-1)c/2+1, \ldots, (r-1)c/2+k+1\}$.

21. A fault-tolerant mesh as recited in claim 19, wherein the degree of each node of the mesh $\hat{M}_k$ is at most $2k+4$ for $k \leq c-3$, and at most $c+k+1$ for $k > c-3$.

22. A fault-tolerant mesh as recited in claim 9, wherein $r \mod 4 = 0$, each node (i,j) of M is assigned an identifier given by the formula $f(i+j)c+j$, with $f(i)=((r/2-1)i) \mod r$.

23. A fault-tolerant mesh as recited in claim 22, wherein the connection pattern for the edges connecting the nodes is defined by a set of offsets $\{(r/2-1)c, (r/2-1)c+1, \ldots, (r/2-1)c+k+1\}$.

24. A fault-tolerant mesh as recited in claim 22, wherein the degree of each node of the mesh $\hat{M}_k$ is at most $2k+4$ for $k \leq 2c-3$, and at most $2c+k+1$ for $k > 2c-3$.

25. A fault-tolerant mesh as recited in claim 9, wherein $r \mod 4 = 2$, each node (i,j) of M is assigned an identifier given by the formula $f(i+j)c+j$, with $f(i)=((r/2-2)i) \mod r$.

26. A fault-tolerant mesh as recited in claim 25, wherein the connection pattern for the edges connecting the nodes is defined by a set of offsets $\{(r/2-2)c, (r/2-2)c+1, \ldots, (r/2-2)c+k+1\}$.

27. A fault-tolerant mesh as recited in claim 25, wherein the degree of each node of the mesh $\hat{M}_k$ is at most $2k+4$ for $k \leq 4c-3$, and at most $4c+k+1$ for $k>4c-3$.

28. A method for constructing a mesh $\hat{M}_k$ tolerating up to k faults, comprising the steps of:
    (a) utilizing one of a diagonal graph representation and a circulant graph representation for the mesh $\hat{M}_k$, which includes a target mesh M having N nodes, and m additional spare nodes, as a model for fabricating $\hat{M}_k$;
    (b) assigning an identifier to each node, the value of each identifier being determined with respect to the graph;
    (c) defining a plurality of edges connected between respective ones of the nodes in accordance with a connection pattern defined in terms of the identifiers assigned to the nodes and the positions of the nodes in the graph; and
    (d) fabricating said k-fault-tolerant mesh $\hat{M}_k$ based on the graph representation; wherein the step of utilizing includes utilizing a graph representation of a mesh $\hat{M}_k$ which is topologically equivalent to at least one hexagon.

29. A method for constructing a mesh $\hat{M}_k$ tolerating up to k faults, comprising the steps of:
    (a) utilizing one of a diagonal graph representation and a circulant graph representation for the mesh $\hat{M}_k$, which includes a target mesh M having N nodes, and m additional spare nodes, as a model for fabricating $\hat{M}_k$;
    (b) assigning an identifier to each node, the value of each identifier being determined with respect to the graph;
    (c) defining a plurality of edges connected between respective ones of the nodes in accordance with a connection pattern defined in terms of the identifiers assigned to the nodes and the positions of the nodes in the graph; and
    (d) fabricating said k-fault-tolerant mesh $\hat{M}_k$ based on the graph representation; wherein the step of utilizing includes utilizing a graph representation of a mesh which is d-dimensional, and the number of nodes N is given by $N = n_1 \times n_2 \times \ldots \times n_d$, where each $n_i$ represents the size of the mesh M in the i-th dimension, with $n_1 \leq n_2 \leq \ldots \leq n_d$ and $n_d \geq 3$.

30. A method as recited in claim 29 wherein, in the step of utilizing, $m = k + n_1 - 1$ for $n_1$ being odd and $m = k + n_1 - 2$ for $n_1$ being even, and the step of utilizing includes defining the edges, for k odd, by the union of the following set of offsets:

$$\left\{ n_1 + j \mid -1 \leq j \leq \frac{k+1}{2} \right\},$$

$$\left\{ n_1 n_2 + j \mid 0 \leq j \leq \frac{k-1}{2} \right\},$$

$$\left\{ n_1 n_2 n_3 + j \mid 0 \leq j \leq \frac{k-1}{2} \right\}, \ldots,$$

and up to $$\left\{ n_1 n_2 \ldots n_{d-1} + j \mid 0 \leq j \leq \frac{k-1}{2} \right\}; \text{ and}$$

defining the edges, for k even, by the union of the following sets of offsets:

$$\left\{ n_1 + j \mid -1 \leq j \leq \frac{k+2}{2} \right\},$$

$$\left\{ n_1 n_2 + j \mid 0 \leq j \leq \frac{k}{2} \right\},$$

$$\left\{ n_1 n_2 n_3 + j \mid 0 \leq j \leq \frac{k}{2} \right\}, \ldots,$$

and up to $$\left\{ n_1 n_2 \ldots n_{d-1} + j \mid 0 \leq j \leq \frac{k}{2} \right\}.$$

31. A method as recited in claim 29, wherein the step of utilizing includes:
    (a) determining the dimension d of target mesh M;
    (b) identifying the structure of target mesh M by inputting the values of $n_1, n_2, \ldots, n_d$;
    (c) inputting k, the number of faults to be sustained by the fault-tolerant mesh $\hat{M}_k$ being constructed;
    (d) defining one of a diagonal graph and a circulant graph having $N+m$ nodes, where $m = k + n_1 - 1$ for $n_1$ being odd and $m = k + n_1 - 2$ for $n_1$ being even;
    (e) defining the edges of the graph, for k odd, by the union of the following sets of offsets:

$$\left\{ n_1 + j \mid -1 \leq j \leq \frac{k+1}{2} \right\},$$

$$\left\{ n_1 n_2 + j \mid 0 \leq j \leq \frac{k-1}{2} \right\},$$

$$\left\{ n_1 n_2 n_3 + j \mid 0 \leq j \leq \frac{k-1}{2} \right\}, \ldots,$$

and up to $$\left\{ n_1 n_2 \ldots n_{d-1} + j \mid 0 \leq j \leq \frac{k-1}{2} \right\}; \text{ and}$$

(f) defining the edges of the graph, for k even, by the union of the following sets of offsets:

$$\left\{ n_1 + j \mid -1 \leq j \leq \frac{k+2}{2} \right\},$$

$$\left\{ n_1 n_2 + j \mid 0 \leq j \leq \frac{k}{2} \right\}$$

$$\left\{ n_1 n_2 n_3 + j \mid 0 \leq j \leq \frac{k}{2} \right\}, \ldots,$$

and up to $$\left\{ n_1 n_2 \ldots n_{d-1} + j \mid 0 \leq j \leq \frac{k}{2} \right\}.$$

32. A method for constructing a mesh $\hat{M}_k$ tolerating up to k faults, comprising the steps of:
  (a) utilizing one of a diagonal graph representation and a circulant graph representation for the mesh $\hat{M}_k$, which includes a target mesh M having N nodes, and m additional spare nodes, as a model for fabricating $\hat{M}_k$;
  (b) assigning an identifier to each node, the value of each identifier being determined with respect to the graph;
  (c) defining a plurality of edges connected between respective ones of the nodes in accordance with a connection pattern defined in terms of the identifiers assigned to the nodes and the positions of the nodes in the graph; and
  (d) fabricating said k-fault-tolerant mesh $\hat{M}_k$ based on the graph representation;
wherein the step of utilizing includes utilizing a graph representation of a mesh which is two-dimensional, wherein d=2, $n_1$ equals a number of columns c, and $n_2$ equals a number of rows r.

33. A method as recited in claim 32, wherein, for k being odd, the edges are defined by the set of offsets:

$$\{c+j | -1 \le j \le (k+1)/2\};$$

and for k being even, the edges are defined by the set of offsets:

$$\{c+j | -1 \le j \le (k+2)/2\}.$$

34. A method as recited in claim 33, wherein the number of extra nodes m is given by $m=k+c-1$ for c being odd and $m=k+c-2$ for c being even.

35. A method as recited in claim 32 wherein the number of spare nodes m is equal to the number of faults k to be tolerated.

36. A method as recited in claim 35, wherein each node of M is assigned an identifier in row-major order.

37. A method as recited in claim 36, wherein the edges are defined according to a connection pattern is defined by a set of offsets $\{1, 2, \ldots, k+1, c, c+1, \ldots, c+k\}$.

38. A method as recited in claim 35, wherein each node (i,j) of M is assigned an identifier in antidiagonal-major order.

39. A method as recited in claim 38, wherein the connection pattern for the edges is defined by a set of offsets $\{c, c+1, \ldots, c+k+1\}$.

40. A method as recited in claim 35, wherein each node of M is assigned an identifier in interleaved antidiagonal-major order.

41. A method as recited in claim 40, wherein the edges are defined according to a connection pattern defined by a set of offsets $\{a, a+1, \ldots, b+k\}$ where $a=\lceil rc/2 \rceil - \lceil r/2 \rceil$ and $b=\lceil rc/2 \rceil + \lfloor r/2 \rfloor$.

42. A method as recited in claim 35, wherein the number of rows r is odd, and each node (i,j) of M is assigned an identifier given by the formula $f(i+j)c+j$, with $f(i)=(i(r-1))/2 \bmod r$.

43. A method as recited in claim 42, wherein the edges are defined according to a connection pattern defined by a set of offsets $\{(r-1)c/2, (r-1)c/2+1, \ldots, (r-1)c/2+k+1\}$.

44. A method as recited in claim 35, wherein r mod 4=0, each node (i,j) of M is assigned an identifier given by the formula $f(i+j)c+j$, with $f(i)=((r/2-1)i) \bmod r$.

45. A method as recited in claim 44, wherein the edges are defined according to a connection pattern defined by a set of offsets $\{(r/2-1)c, (r/2-1)c+1, \ldots, (r/2-1)c+k+1\}$.

46. A method as recited in claim 35, wherein r mod 4=2, each node (i,j) of M is assigned an identifier given by the formula $f(i+j)c+j$, with $f(i)=((r/2-2)i) \bmod r$.

47. A method as recited in claim 46, wherein the edges are defined according to a connection pattern defined by a set of offsets $\{(r/2-2)c, (r/2-2)c+1, \ldots, (r/2-2)c+k+1\}$.

48. A method for locating a healthy target mesh M in a fault-tolerant mesh $\hat{M}_k$, in the presence of up to k faults, and reconfiguring $\hat{M}_k$ to obtain M, given (1) the dimension d of M, (2) the value of k, (3) the value of $n_1$, $n_2, \ldots, n_d$, the values of the lengths of the sides of the d-dimensional mesh M, where $n_1 \le n_2 \le \ldots \le n_d$ and $n_d \ge 3$, (4) the structure of the fault-tolerant mesh $\hat{M}_k$ in terms of one of a diagonal graph model and a circulant graph model, and (5) the location of up to k faults in $\hat{M}_k$, comprising the steps of:
  (a) determining if the number of faults sustained in $\hat{M}_k$ is less than k;
  (b) choosing k−x non-faulty nodes and designating the k−x nodes as faulty if x<k, where x is the number of actual faulty nodes, for a total of k faults;
  (c) identifying a first node of the target mesh M from among the non-faults remaining in $\hat{M}_k$; and
  (d) relabeling the nodes in $\hat{M}_k$, in relation to the first node to obtain the healthy mesh M;
wherein, starting with the first node of the target mesh, an identifier l is assigned to each non-faulty node $(i_1, i_2, \ldots, i_d)$, where $$i_1 = (l + 1) \bmod n_1,$$

$$i_2 = x \bmod n_2,$$

where $x = \lfloor (l+1)/i_1 \rfloor - ((i_1 + 1) \bmod 2)$, $$i_3 = \lfloor \frac{x}{n_2} \rfloor \bmod n_3,$$

$$i_4 = \lfloor \frac{x}{n_2 n_3} \rfloor \bmod n_4, \ldots,$$

and up to $i_{d-1} = \lfloor \frac{x}{n_2 n_3 \ldots n_{d-2}} \rfloor \bmod n_{d-1}$, and $i_d = \lfloor \frac{x}{n_2 n_3 \ldots n_{d-1}} \rfloor$;

and where nodes with label l for which $i_d < 0$ or $i_d \ge n_d$ are omitted.

49. A process for locating a target d-dimensional mesh M having N nodes, where $N = n_1 \times n_2 \times \ldots \times n_d$, with $n_1 \le n_2 \le \ldots \le n_d$ and $n_d \ge 3$, in a k-fault-tolerant mesh $\hat{M}_k$ that has sustained up to k faults, where $\hat{M}_k$ can be represented by a circulant graph model, and where $j = n_1 \times n_2 \times \ldots \times n_{d-1}$, comprising the steps of:
  (a) identifying each faulty and non-faulty node in $\hat{M}_k$ and the circulant graph representation thereof;
  (b) counting the number of faults and non-faults in $\hat{M}_k$ for all nodes i in $\hat{M}_k$, where $0 \le i \le N+m-k-1$, starting at node i, proceeding in a first order around the circulant graph model;
  (c) checking the non-fault count after each non-faulty node is detected and determining if the non-fault count is greater than j;
  (d) terminating the step of counting if the non-fault count is greater than j;

(e) determining, after said step of terminating, if the number of faults is greater than k/2 and if so, designating node i as a marked node, otherwise designating node i as unmarked; and (f) repeating steps (a) through (e) for each node i in mesh $\hat{M}_k$ for $0 \leq i \leq N+m-k-1$.

50. A method as set forth in claim 49, wherein each non-faulty marked node is a candidate for the first node of the target mesh M.

51. A method as set forth in claim 50, further comprising the step of determining which non-faulty marked node is to be designated as the first node of the target mesh M.

52. A method as set forth in claim 51, wherein said step of determining which non-faulty marked node is to be designated as the first node of the target mesh M further comprises the steps of:

(a) visiting the nodes of said circulant graph, starting with an arbitrary node, in a second pre-selected direction;

(b) counting, as each node is visited, the number of non-faulty unmarked nodes, resetting the count whenever a non-faulty marked node is visited;

(c) terminating the step of visiting when the number of non-faulty unmarked nodes is greater than or equal to N/2, and designating the node being visited at the time of termination as the starting node of a second visitation process;

(d) visiting the nodes of said circulant graph in a second visitation process, beginning with said starting node, in the opposite direction of said second pre-selected direction, and terminating said second visitation process when a non-fault which is marked is encounted; and (e) designating the encountered non-faulty marked node as the first node of the target mesh M.

53. A method as set forth in claim 52, further comprising the step of assigning node identifiers to each non-faulty node.

54. A method as set forth in claim 53, further comprising the steps of:

(a) determining if the number of faults sustained in $\hat{M}_k$ is less than k; and (b) choosing k−x non-faulty nodes and designating the k−x nodes as faulty if x<k, where x is the number of actually faulty nodes, for a total of k faults.

55. A method of constructing a k-fault-tolerant mesh $\hat{M}_k$ that includes a mesh M having N nodes, where $\hat{M}_k$ can sustain up to k faults and be reconfigured to form mesh M, and locating M in $\hat{M}_k$ when up to k faults are sustained by $\hat{M}_k$, comprising the steps of:

(a) representing the N nodes of M and m additional nodes in the form of one of a diagonal graph and a circulant graph;

(b) defining edges of the graph representing connections between respective ones of the nodes in terms of a predetermined connection pattern;

(c) determining which non-faults in $\hat{M}_k$ are to be considered as candidates for a first node of the mesh M whenever $\hat{M}_k$ sustains up to k faults;

(d) determining which of the candidate non-faults is to be the first node of the target mesh M; and (e) assigning an identifier to each non-fault according to a predetermined naming convention and starting with the first node of the target mesh M;

wherein the step of utilizing includes utilizing a graph representation of a mesh $\hat{M}_k$ which is topologically equivalent to at least one hexagon.

56. A method of constructing a k-fault-tolerant mesh $\hat{M}_k$ that includes a mesh M having N nodes, where $\hat{M}_k$ can sustain up to k faults and be reconfigured to form mesh M, and locating M in $\hat{M}_k$ when up to k faults are sustained by $\hat{M}_k$, comprising the steps of:

(a) representing the N nodes of M and m additional nodes in the form of one of a diagonal graph and a circulant graph;

(b) defining edges of the graph representing connections between respective ones of the nodes in terms of a predetermined connection pattern;

(c) determining which non-faults in $\hat{M}_k$ are to be considered as candidates for a first node of the mesh M whenever $\hat{M}_k$ sustains up to k faults;

(d) determining which of the candidate non-faults is to be the first node of the target mesh M; and (e) assigning an identifier to each non-fault according to a predetermined naming convention and starting with the first node of the target mesh M;

wherein the step of utilizing includes utilizing a graph representation of a mesh $\hat{M}_k$ which is d-dimensional, and the number of nodes N is given by $N = n_1 \times n_2 \times \ldots \times n_d$, where each $n_i$ represents the size of the mesh M in the i-th dimension, with $n_1 \leq n_2 \leq \ldots \leq n_d$ and $n_d \geq 3$.

57. A method as recited in claim 56 wherein the step of defining edges defines the edges of the graph, representing connections between respective ones of the nodes, by the union of the following sets of offsets:

(i) for k odd, $$\left\{ n_1 + j \,\middle|\, -1 \leq j \leq \frac{k+1}{2} \right\},$$

$$\left\{ n_1 n_2 + j \,\middle|\, 0 \leq j \leq \frac{k-1}{2} \right\},$$

$$\left\{ n_1 n_2 n_3 + j \,\middle|\, 0 \leq j \leq \frac{k-1}{2} \right\}, \ldots,$$

and up to $$\left\{ n_1 n_2 \ldots n_{d-1} + j \,\middle|\, 0 \leq j \leq \frac{k-1}{2} \right\}; \text{ and}$$

(ii) for k even, $$\left\{ n_1 + j \,\middle|\, -1 \leq j \leq \frac{k+2}{2} \right\},$$

$$\left\{ n_1 n_2 + j \,\middle|\, 0 \leq j \leq \frac{k}{2} \right\},$$

$$\left\{ n_1 n_2 n_3 + j \,\middle|\, 0 \leq j \leq \frac{k}{2} \right\}, \ldots,$$

and up to $$\left\{ n_1 n_2 \ldots n_{d-1} + j \,\middle|\, 0 \leq j \leq \frac{k}{2} \right\}$$

58. A method as recited in claim 56, wherein the step of assigning an identifier l to each non-fault employs a naming convention, starting with the first node of the target mesh M in which: $(i_1, i_2, \ldots, i_d)$, where $i_1 = (l + 1) \bmod n_1$, $i_2 = x \bmod n_2$, where $x = \lfloor (l + 1)/i_1 \rfloor - ((i_1 + 1) \bmod 2)$, $i_3 = \lfloor \frac{x}{n_2} \rfloor \bmod n_3$, $i_4 = \lfloor \frac{x}{n_2 n_3} \rfloor \bmod n_4, \ldots$, and up to $i_{d-1} = \lfloor \frac{x}{n_2 n_3 \ldots n_{d-2}} \rfloor \bmod n_{d-1}$, and $i_d = \lfloor \frac{x}{n_2 n_3 \ldots n_{d-1}} \rfloor$;

and where nodes with label l for which $i_d < 0$ or $i_d \geq n_d$ are omitted.

59. A method of constructing a k-fault-tolerant mesh $\hat{M}_k$ that includes a mesh M having N nodes, where $\hat{M}_k$ can sustain up to k faults and be reconfigured to form mesh M, and locating M in $\hat{M}_k$ when up to k faults are sustained by $\hat{M}_k$, comprising the steps of:
 (a) representing the N nodes of M and m additional nodes in the form of one of a diagonal graph and a circulant graph;
 (b) defining edges of the graph representing connections between respective ones of the nodes in terms of a predetermined connection pattern;
 (c) determining which non-faults in $\hat{M}_k$ are to be considered as candidates for a first node of the mesh M whenever $\hat{M}_k$ sustains up to k faults;
 (d) determining which of the candidate non-faults is to be the first node of the target mesh M; and
 (e) assigning an identifier to each non-fault according to a predetermined naming convention and starting with the first node of the target mesh M;
wherein the maximum degree of the circulant graph and corresponding mesh $\hat{M}_k$ is $(d-1)k+d+3$ when k is odd and $(d-1)k+2d+2$ when k is even.

60. A method of constructing a k-fault-tolerant mesh $\hat{M}_k$ that includes a mesh M having N nodes, where $\hat{M}_k$ can sustain up to k faults and be reconfigured to from mesh M, and locating M in $\hat{M}_k$ when up to k faults are sustained by $\hat{M}_k$, comprising the steps of:
 (a) representing the N nodes of M and m additional nodes in the form of one of a diagonal graph and a circulant graph;
 (b) defining edges of the graph representing connections between respective ones of the nodes in terms of a predetermined connection pattern;
 (c) determining which non-faults in $\hat{M}_k$ are to be considered as candidates for a first node of the mesh M whenever $\hat{M}_k$ sustains up to k faults;
 (d) determining which of the candidate non-faults is to be the first node of the target mesh M; and
 (e) assigning an identifier to each non-fault according to a predetermined naming convention and starting with the first node of the target mesh M;
wherein the mesh M to be located is two-dimensional, $d=2$, $n_1 =$ a number of columns c, and $n_2 =$ a number of rows r.

61. A method as recited in claim 60, wherein for k being odd, the edges are defined by the set of offsets:

$\{c+j \mid -1 \leq j \leq (k+1)/2\}$;

and for k being even, the edges are defined by the set of offsets:

$\{c+j \mid -1 \leq j \leq (k+2)/2\}$.

62. A method as recited in claim 60, wherein the number of extra nodes m is equal to the number of faulty nodes k which are to be tolerated.

63. A method as recited in claim 62, wherein each node of M is assigned an identifier in row-major order, and the step of relabeling is done in relation to the identifiers assigned to the nodes.

64. A method as recited in claim 62, wherein each node of M is assigned an identifier in antidiagonal-major order, and the step of relabeling is done in relation to the identifiers assigned to the nodes.

65. A method as recited in claim 62, wherein each node of M is assigned an identifier in interleaved antidiagonal-major order, and the step of relabeling is done in relation to the identifiers assigned to the nodes.

66. A method as recited in claim 62, wherein the number of rows r is odd, and each node (i,j) of M is assigned an identifier given by the formula $f(i+j)c+j$, with $f(i)=(i(r-1))/2 \bmod r$, and the step of relabeling is done in relation to the identifiers assigned to the nodes.

67. A method as recited in claim 62, wherein r mod $4=0$, each node (i,j) of M is assigned an identifier given by the formula $f(i+j)c+j$, with $f(i)=((r/2-1)i) \bmod r$, and the step of relabeling is done in relation to the identifiers assigned to the nodes.

68. A method as recited in claim 62, wherein r mod $4=2$, each node (i,j) of M is assigned an identifier given by the formula $f(i+j)c+j$, with $f(i)=((r/2-2)i) \bmod r$, and the step of relabeling is done in relation to the identifiers assigned to the nodes.

69. An apparatus for identifying a healthy mesh M in a fault-tolerant mesh $\hat{M}_k$, given a set of up to k faults, where $\hat{M}_k$ has $N+m=(n_1 \times n_2 \times \ldots \times n_d)+m$ nodes, and $m=k+n_1-1$ for $n_1$ being odd and $m=k+n_1-2$ for $n_1$ being even, with $n_1 \leq n_2 \leq \ldots \leq n_d$ and $n_d \geq 3$, comprising:
 (a) means for identifying which nodes in $\hat{M}_k$ are to be considered as candidates for a first node of the mesh M;
 (b) means for determining which of the candidate nodes is to be the first node of the target mesh M, wherein said means for determining is responsive to input from said means for identifying; and
 (c) reconfiguration means for assigning identifier to nodes in mesh $\hat{M}_k$, starting with the first node, as identified by said means for determining, wherein said set of identifiers are determined by $i_1 = (l + 1) \bmod n_1$, $i_2 = x \bmod n_2$, where $x = \lfloor (l + 1)/i_1 \rfloor - ((i_1 + 1) \bmod 2)$, $i_3 = \lfloor \frac{x}{n_2} \rfloor \bmod n_3$, $i_4 = \lfloor \frac{x}{n_2 n_3} \rfloor \bmod n_4, \ldots$, -continued $$\text{and up to } i_{d-1} = \left\lfloor \frac{x}{n_2 n_3 \ldots n_{d-2}} \right\rfloor \bmod n_{d-1},$$

-continued $$\text{and } i_d = \left\lfloor \frac{x}{n_2 n_3 \ldots n_{d-1}} \right\rfloor ;$$

and where nodes with label l for which $i_d < 0$ or $i_d \geq n_d$ are omitted.

* * * * *